US006570687B2

United States Patent
Araki et al.

(10) Patent No.: US 6,570,687 B2
(45) Date of Patent: May 27, 2003

(54) OPTICAL PACKET EXCHANGE SYSTEM AND OPTICAL SWITCH

(75) Inventors: Soichiro Araki, Tokyo (JP); Yoshihiko Suemura, Tokyo (JP); Akio Tajima, Tokyo (JP); Seigo Takahashi, Tokyo (JP); Yoshiharu Maeno, Tokyo (JP); Naoya Henmi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/123,444

(22) Filed: Apr. 16, 2002

(65) Prior Publication Data

US 2002/0109882 A1 Aug. 15, 2002

Related U.S. Application Data

(62) Division of application No. 09/210,277, filed on Dec. 11, 1998, now Pat. No. 6,441,935.

(30) Foreign Application Priority Data

Dec. 12, 1997 (JP) ............................................... 9-362860

(51) Int. Cl.[7] ................................................ H04J 14/08
(52) U.S. Cl. ........................ 359/139; 359/128; 359/117; 370/528; 370/366; 370/433; 370/468
(58) Field of Search ............................... 359/128, 127, 359/120, 121, 123, 125, 139, 117, 133, 135; 370/433, 366, 415, 422, 468, 429, 528

(56) References Cited

U.S. PATENT DOCUMENTS

| 4,834,483 | A | * | 5/1989 | Arthurs et al. | ........... 350/96.16 |
| 4,873,681 | A | * | 10/1989 | Arthurs et al. | ................. 370/3 |
| 5,005,167 | A | * | 4/1991 | Arthurs et al. | ................. 370/4 |
| 5,018,130 | A | * | 5/1991 | Suzuki et al. | ................. 370/1 |
| 5,093,743 | A | * | 3/1992 | Eng et al. | ................... 359/120 |
| 5,197,097 | A | | 3/1993 | Takahashi et al. | |

(List continued on next page.)

FOREIGN PATENT DOCUMENTS

| JP | A-4-72939 | 3/1992 |
| JP | H4-72939 | 3/1992 |
| JP | H4-162852 | 6/1992 |
| JP | H9-98188 | 4/1997 |
| JP | 9-167994 | 6/1997 |
| JP | 9-224052 | 8/1997 |
| JP | H10-243017 | 9/1998 |

OTHER PUBLICATIONS

Shingakugihou [Telecommunications News] SSE98-165~175 (SSE98-170).

*Primary Examiner*—Leslie Pascal
*Assistant Examiner*—Hanh Phan
(74) *Attorney, Agent, or Firm*—Scully, Scott, Murphy & Presser

(57) ABSTRACT

An optical packet exchange apparatus and an optical switch in which search for a connection pattern between an input unit devoid of a packet to be transmitted and an output unit devoid of a packet to be received is reduced to enable fast switch control even in cases wherein the number of channels of the exchange apparatus is increased or network speed is higher. A plurality of input units, a plurality of output units and an optical switch are provided. Each input unit includes an input buffer unit, a parallel/serial conversion unit, an electrical/optical conversion unit, and a dummy packet insertion unit for sending a dummy packet if there is no packet to be transmitted. Each output unit includes an exchange counterpart contention resolution unit for controlling the exchange counterpart, an optical/electrical conversion unit, a serial/parallel conversion unit, and a packet eliminating unit. The exchange counterpart contention resolution unit controls the packet eliminating unit to eliminate a dummy packet.

6 Claims, 37 Drawing Sheets

U.S. PATENT DOCUMENTS 5,353,145 A * 10/1994 Le Coquil et al. .......... 359/139
5,483,370 A    1/1996 Takahashi
5,506,710 A * 4/1996 Hamel ........................ 359/115
5,812,290 A    9/1998 Maeno et al.
5,828,472 A * 10/1998 Masetti ....................... 359/123
5,889,600 A * 3/1999 McGuire ..................... 359/128
5,963,350 A   10/1999 Hill
6,188,686 B1   2/2001 Smith
6,414,766 B1 * 7/2002 Vinel et al. .................. 359/117

* cited by examiner

DUMMY PACKET DESTINATION ADDRESS COMPUTATION

FIG. 28

| DESTINATION OUTPUT UNIT NUMBER | ADDRESS SIGNAL | OPTICAL GATE 874-1, 3, 5, 7 | OPTICAL GATE 874-2, 4, 6, 8 | VARIABLE WAVELENGTH E/O TRANSMISSION LIGHT WAVELENGTH |
|---|---|---|---|---|
| 1 | 00 | ON | OFF | $\lambda 1$ |
| 2 | 01 | ON | OFF | $\lambda 2$ |
| 3 | 10 | OFF | ON | $\lambda 1$ |
| 4 | 11 | OFF | ON | $\lambda 2$ |

OPTICAL PACKET EXCHANGE SYSTEM AND OPTICAL SWITCH

CROSS REFERENCE TO RELATED APPLICATION

The present application is a divisional of application Ser. No. 09/210,277 filed on Dec. 11, 1998, now U.S. Pat. No. 6,441,935.

TECHNICAL FIELD OF THE INVENTION

This invention relates to a packet exchange apparatus. More particularly, it relates to a broad-band optical packet exchange apparatus employing an inexpensive optical/electrical converter.

BACKGROUND OF THE INVENTION

In a packet exchange apparatus employing an optical switch in an exchange stage and also employing an electrical/optical converter and an optical/electrical converter in an input/output unit, the optical/electrical converter is usually of an ac coupling circuit configuration. In this case, there is presented a problem that, if there is any time period during which the 1 or 0 level continues for a longer time than a pre-set time period or during which there is no packet to be received, data dropout occurs in the packet or in the directly following packet.

As a method for overcoming this problem, there is proposed in, for example, JP Patent Kokai JP-A-4-72939 a packet exchange apparatus employing an optical switch in which a dummy data appending circuit is provided on the transmission side so that dummy data is transmitted during a domain (length of time) in which there is no transmission data while the appended dummy data is removed by a dummy data removing circuit provided on the reception side, so that it is attempted to eliminate occurrence of no time devoid of transmission data on the transmission route there is no continuation of 0 or 1 for a longer time than a pre-set time, thus eliminating the malfunction of data dropout in the optical/electrical converter. This method consists in sending a dummy packet in the absence of packets for transmission on the input side.

This dummy packet is a pattern which is made up of at least one bit of 0 and the same number of bit of 1, with 0 or 1 not continuing for longer than a pre-set time, and to which is appended a particular code by which the packet can be judged to be a dummy packet. An output unit includes a dummy packet eliminating circuit which discriminates a dummy packet based on the possible presence of the particular code specifying a dummy packet to eliminate the discriminated dummy packet in order to receive only the necessary packets.

In case where, in this configuration, there are packets to be transmitted to the same output unit on plural input units, a contention resolution circuit is used in order to inhibit packet interference due to arrival of plural packets at the same output unit, which would lead to reception of erroneous data.

If a connection request is received from the input unit before the input unit sends a transmission packet and connection requests are made to the sole output unit from plural input units, the contention resolution circuit selects a sole input unit from the plural input units to give the input unit a permission for connection. The remaining input units are inhibited from connection. Since the input units inhibited as to connection are equivalent to the input units devoid of the packets for transmission, these input units send dummy packets. The contention resolution circuit has to detect an input unit devoid of the packets for transmission and an output unit devoid of packets for reception and to find out a connection pattern to interconnect these input and output units.

FIG. 37 shows a configuration of a conventional optical switch used in an exchange stage. Referring to FIG. 37, this optical switch is a 4-input 4-output splitter/combiner type optical switch having four light splitters 10, 16 optical gates 11 and four light combiners 12. For controlling this switch, 42 or 16 control lines are required to control the 16 optical gates.

SUMMARY OF THE DISCLOSURE

During the course of investigations toward the present invention, the following problems have been encountered.

In sending packets from a sending station to the exchange apparatus, the sending station transmits, along with a packet (s), a destination address specifying the receiving station to receive the packet(s), to the exchange apparatus. In the absence of packets to be transmitted in the input unit, no designation of the destination address is made from the transmitting station to the input unit.

In transmitting a dummy packet by the above-described conventional packet exchange apparatus, a contention resolution circuit searches an input unit devoid of a packet(s) to be transmitted and an output unit devoid of a packet(s) to be received and controls the optical switch driving circuit for interconnecting these input and output units.

Unless this search is expedited or it is constructed so as to unnecessitate the search, the exchange apparatus is increased in the circuit scale. If the network speed is increased, it becomes impossible to control the exchange apparatus at a high speed.

Meanwhile, since the dummy packet is deemed in the receiving station as being unnecessary or erroneous data, it is necessary to provide a dummy packet eliminating system in order to prevent the dummy packet from being output from the exchange apparatus to the receiving station.

In the dummy packet eliminating system of the conventional packet exchange apparatus, described above, the special code specifying a dummy packet appended to the dummy packet is detected for eliminating the dummy packet. That is, in case where a packet other than the dummy packet is received as a substitute for the dummy packet in order to avoid malfunction of an O/E converter of an output unit inherently having no packet to be received, the dummy packet eliminating system cannot eliminate this packet as an invalid packet and erroneously sends this packet to the reception station.

Therefore, in the above-described conventional packet exchange apparatus, an output unit devoid of the packet to be received has to be connected to an input unit transmitting a dummy packet, that is to an input unit devoid of the packet to be transmitted, such that it becomes necessary to search and connect input and output units sending and receiving the dummy packet expeditiously.

Another problem is the interconnection for control signals for the optical switch. That is, if the optical switch is increased in scale, the control signal lines between the optical switch and the control circuits are increased in volume and structure thus causing congestion of the control signal lines.

For example, if, in the case of a 128 by 128 line full-cross bus switch, a bit map of the switch connection pattern is formulated in the control circuit and a control signal is sent to the optical switch, $128^2$ or 16384 control lines are required. Since these numerous control signal lines affect mounting of the exchange apparatus or optical switches, it is incumbent to reduce the number of the control signal lines.

In view of the above-described problems, it is a primary object of the present invention to eliminate any of the aforementioned problems. Particularly, it is an object of the present invention to provide an optical packet exchange apparatus and an optical switch in which searching for connection patterns between input units devoid of packet(s) for transmission and output units devoid of packet(s) for reception is reduced and can be performed speedily. It is another object to provide an optical packet exchange apparatus and an optical switch in which, if the number of channels of the exchange apparatus is increased or the network speed is higher, switch control can be made quickly to suppress or reduce the hardware scale.

Still further objects of the present invention will become apparent in the entire disclosure including the claims.

For accomplishing the above object, the first aspect of the present invention resides in the following features: An optical packet exchange apparatus includes (a) a plurality of input devices having input buffer means (units), parallel/serial conversion means (units), electrical/optical conversion means (units), and dummy packet insertion means (units) for sending a dummy packet if there is no packet to be transmitted. The apparatus further includes (b) exchange counterpart contention resolution means (units) for controlling an exchange counterpart, (c) a plurality of output devices having optical/electrical conversion means (units), serial/parallel conversion means (units) and packet eliminating means (units), and (d) an optical switch (e) wherein the packets are exchanged, and (f) wherein the exchange counterpart contention resolution means (units) controls the packet eliminating means to eliminate the dummy packet.

In a second aspect of the present invention, related to the first aspect of the invention, the packet exchange apparatus is characterized in that the dummy packet inserting means includes a dummy packet generating circuit, a selector circuit and a packet readout circuit for controlling the selector circuit and the input buffer means.

In a third aspect of the present invention, related to the first aspect of the invention, the packet exchange apparatus is characterized in that the dummy packet inserting means is an encoding circuit and the dummy packet eliminating means is a decoding circuit.

In a fourth aspect of the present invention, a packet exchange apparatus includes (a) a plurality of input devices having input buffer means, parallel/serial conversion means and electrical/optical conversion means, (b) a dummy packet inputting device for transmitting a dummy packet, (c) exchange counterpart contention resolution means for controlling an exchange counterpart, (d) a plurality of output devices having optical/electrical conversion means, serial/parallel conversion means and packet eliminating means, and (e) an optical switch; and (f) the exchange counterpart contention resolution means controls the packet eliminating means to eliminate the dummy packet.

In a fifth aspect of the present invention, a packet exchange apparatus includes (a) a plurality of input devices having input means, parallel/serial conversion means, electrical/optical conversion means, and dummy packet insertion means for sending a dummy packet if there is no packet to be transmitted, (b) exchange counterpart contention resolution means for controlling an exchange counterpart, (c) a plurality of output devices having optical/electrical conversion means, serial/parallel conversion means and packet eliminating means, and (d) an optical switch. (e) The output device includes an address comparator circuit for controlling the packet eliminating means based on results of comparison of the destination address of the received packet to an address allocated to the output device.

In the sixth aspect of the present invention, related to the fifth aspect of the invention, the dummy packet inserting means (unit) includes a dummy packet generating circuit, a selector circuit and a packet readout circuit for controlling the selector circuit and the input buffer means.

In the seventh aspect of the present invention, related to the fifth aspect of the invention, dummy packet inserting means is an encoding circuit and the dummy packet eliminating means is a decoding circuit.

In the eighth aspect of the present invention, related to the fifth aspect of the invention, the destination address in the dummy packet is set to an address other than the address allocated to the connected output device.

In a ninth aspect of the present invention, a packet exchange apparatus includes (a) a plurality of input devices having input buffer means, parallel/serial conversion means and electrical/optical conversion means; (b) a dummy packet inputting device for transmitting a dummy packet; (c) exchange counterpart contention resolution means for controlling an exchange counterpart; (d) a plurality of output devices having optical/electrical conversion means, serial/parallel conversion means and packet eliminating means; and (e) an optical switch. (f) The output device includes an address comparison circuit which controls the packet eliminating means from the results of comparison of a destination address of a received packet to an address allocated to the output device.

In a tenth aspect of the present invention, related to the ninth aspect of the invention, the destination address in the dummy packet is set to an address other than the address allocated to the connected output device.

In a eleventh aspect of the present invention, a packet exchange apparatus includes (a) a plurality of input devices having input buffer means, parallel/serial conversion means, electrical/optical conversion means, and dummy packet insertion means for sending a dummy packet if there is no packet to be transmitted; (b) exchange counterpart contention resolution means for controlling an exchange counterpart; (c) a plurality of output devices having optical/electrical conversion means, serial/parallel conversion means, packet eliminating means and dummy packet code detection means for detecting a code specifying a dummy packet to control the packet eliminating means; and (d) an optical switch. It is characterized by further including (e) a dummy packet destination address calculating circuit setting a connection pattern so that different input devices output dummy packets to respective non-selected output devices.

In a twelfth aspect of the present invention, related to the eleventh aspect of the invention, dummy packet inserting means includes a dummy packet generating circuit, a selector circuit and a packet readout circuit controlling the selector circuit and the input buffer means.

In a thirteenth aspect of the present invention, related to the eleventh aspect of the invention, dummy packet inserting means is an encoding circuit and the dummy packet eliminating means is a decoding circuit.

In a fourteenth aspect of the present invention, an optical packet exchange apparatus includes (a) a plurality of input devices having input buffer means, parallel/serial conversion means, electrical/optical conversion means and dummy packet insertion means for sending a dummy packet if there is no packet to be transmitted; (b) exchange counterpart contention resolution means for controlling an exchange counterpart; (c) a plurality of output devices having optical/electrical conversion means, serial/parallel conversion means, packet eliminating means and dummy packet code detection means for detecting a code specifying a dummy packet to control the packet eliminating means; (d) an optical switch. It is characterized by further including (e) a dummy packet sender addresses calculating circuit for setting a connection pattern so that a non-selected output device (unit) will receive a dummy packet from at least one input device (unit) having no packet to be transmitted.

In a fifteenth aspect of the invention, dummy packet inserting means includes a dummy packet generating circuit, a selector circuit and a packet readout circuit controlling the selector circuit and the input buffer means.

In a sixteenth aspect of the invention, dummy packet inserting means is an encoding circuit and the dummy packet eliminating means is a decoding circuit.

In a seventeenth aspect of the invention, an optical packet exchange apparatus includes:
(a) a plurality of input devices having input buffer means, parallel/serial conversion means and electrical/optical conversion means; (b) a dummy packet input device transmitting a dummy packet; (c) exchange counterpart contention resolution means for controlling an exchange counterpart; (d) a plurality of output devices having optical/electrical conversion means, serial/parallel conversion means and packet eliminating means; and (e) an optical switch, (f) wherein the output device includes a dummy packet code detection circuit detecting a code specifying a dummy packet, for controlling the packet eliminating means, and (g) wherein an output device having no packet to be received is connected to the dummy packet input device.

In an eighteenth aspect of the invention, an optical switch includes (a) a plurality of transmitters having variable wavelength electrical/optical converting means and address decoding means; (b) optical combining/splitting means; and (c) a plurality of receivers (reception devices) having fixed wavelength filter means and optical/electrical converting means, and is characterized by further including (d) an address conversion circuit converting an address to be accorded to the address decoding means from a sender address for a receiver to a destination address for a transmitter (sender device).

In a nineteenth aspect of the invention, an optical switch includes (a) a plurality of transmitters having fixed wavelength electrical/optical conversion means having different wavelengths allocated to different transmitters; (b) optical combining/splitting means; (c) a plurality of receivers having wavelength selection means, optical/electrical converting means and address decoding means; and further including (d) an address conversion circuit converting an address to be accorded to the address decoding means from a destination address for a transmitter to a sender address for a receiver.

In a twentieth aspect oft the invention, an optical switch includes (a) M groups of variable wavelength electrical/optical converting means, each of the groups having N variable wavelength electrical/optical converting means each outputting an optical signal of any one of M different wavelengths $\lambda 1, \lambda 2, \ldots \lambda M$, N and M being integers not less than 2; (b) M-number of N×K-optical spatial switch means for switching paths of N optical output signals of one group of the variable wavelength electrical/optical converting means, K being an integer not less than 2; (c) K-number of optical combining/splitting means for combining optical signals from respective different output ports of the M-number of N×K-optical spatial switch means for splitting the combined signal into M-number of outputs; (d) MK-number of fixed wavelength filter means; and (e) MK-number of optical/electrical converting means. (f) The optical spatial switch includes (f1) N-number of optical splitting means branched into K branches, (f2) optical gate means for turning optical signals branched by the optical splitting means on/off, and (f3) K-number of optical combining means for combining optical signals from K-number of different optical branching means. The optical switch further includes address decoding means for controlling the variable wavelength electrical/optical converting means and one of the optical gate means connected to the optical splitting means.

In a twenty-first aspect of the invention, related to the twentieth aspect of the invention, address conversion means for converting a sender address for a receiver to a destination address for a transmitter to enter the converted destination address to the address decoding means.

In a twenty-second aspect of the invention, an optical switch includes; (a) K groups of fixed wavelength electrical/optical converting means, each of the groups having M-number of fixed wavelength electrical/optical converting means to which are allocated M different wavelengths $\lambda 1, \lambda 2, \ldots, \lambda M$, M and K being integers not less than 2; (b) K-number of optical combining/splitting means for combining M-number of optical outputs of one group of the fixed wavelength electrical/optical converting means and for branching the combining signal into M branches; (c) M-number of K×N optical spatial switch means having outputs of K different optical combining/splitting means as inputs, N being an integer not less than 2; (d) MN-number of wavelength selecting means for selecting an optical signal of any wavelength from the outputs of the optical spatial switch means, to output the selected signal; and (e) MN-number of optical/electrical converting means. (f) The optical spatial switch means has (f1) K-number of optical splitting means branched into N branches, (f2) optical gate means for turning the optical signals branched by the optical splitting means on/off, and (f3) N-number of optical combining means for combining optical signals branched by the K different optical branching means. (g) There is further provided address decoding means for controlling one of the optical gate means connected to the optical combining means and the wavelength selecting means by a sender address for a receiver.

In a twenty-third aspect of the invention, related to the twenty-second aspect, there is address conversion means for converting a destination address for a transmitter to a sender address for a receiver to supply the converted destination address to the address decoding means.

In the optical packet exchange apparatus according to the 24th aspect, related to the first aspect, (bx) the exchange counterpart contention resolution means: (b1) judges contention on respective output devices based on a destination address from the input device and connection request signals, (b2) sets a connection pattern of the optical switch from the results of contention judgment, and (b3) sets a connection pattern so that an output device not required to be connected is connected to one of the input devices, (dx) wherein optical switch control means controls the optical switch to connect the input and output devices in accordance with the connection pattern, and, (by) wherein said exchange counterpart contention resolution means sends a packet discarding control signal to the packet eliminating means of the output device not required to be connected to eliminate a dummy packet.

BRIEF DESCRIPTION OF THE DRAWINGS

FIG. 28 illustrates the optical switch control operation in Example 10.

PREFERRED EMBODIMENTS

Preferred embodiments of the present invention will be hereinafter explained.

Figure 1:
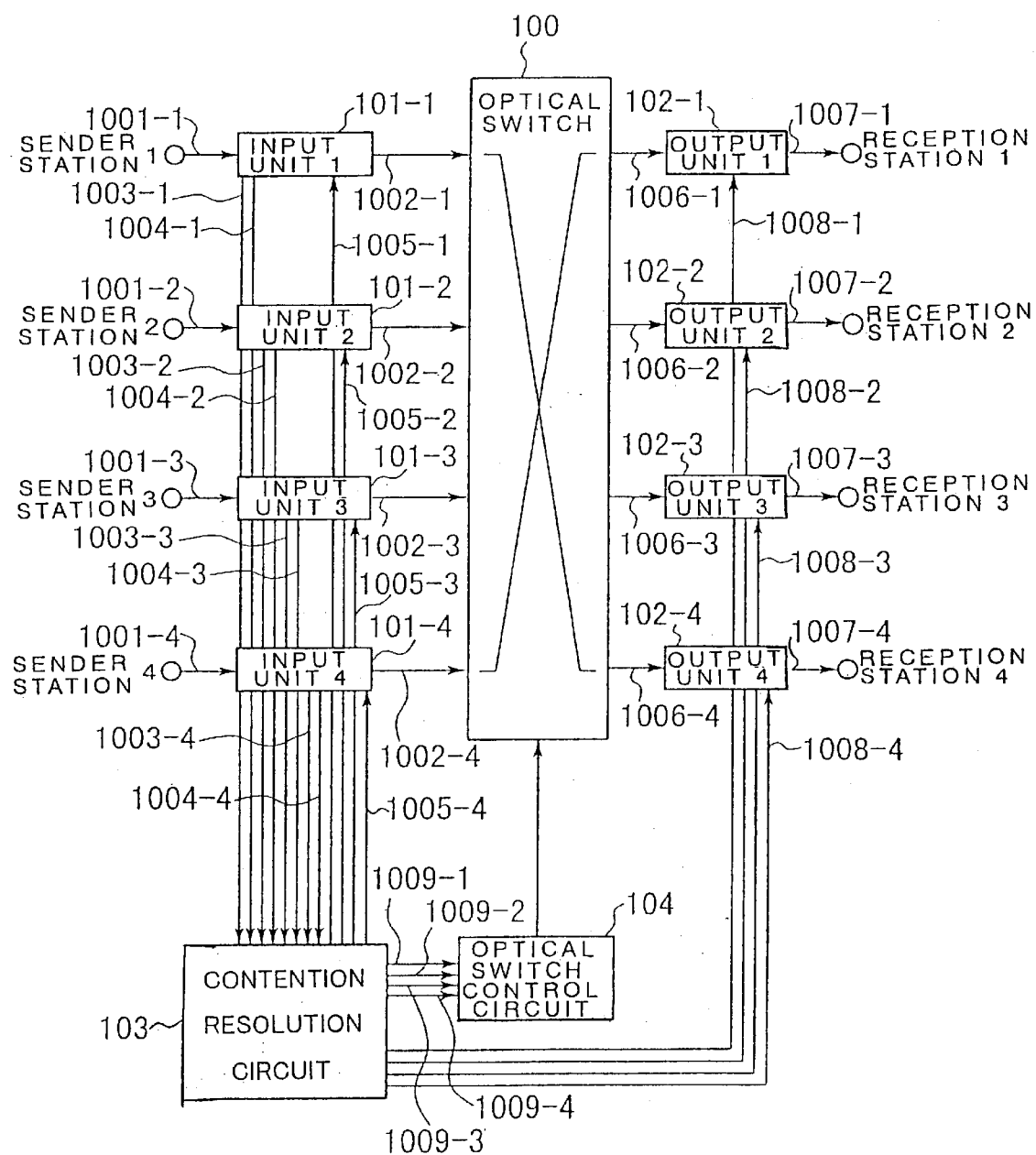
FIG. 1 illustrates the structure of Example 1.

An optical packet exchange apparatus according to a preferred embodiments of the present invention includes plural input devices (101 of FIG. 1), an exchange counterpart contention resolution means (103 of FIG. 1), plural output devices (102 of FIG. 1), an optical switch (100 of FIG. 1) and an optical switch control means (104 of FIG. 1). Each input device is made up of an input buffer means (107 of FIG. 2), parallel/serial converting means (111 of FIG. 2), an electro-optical converting means (112 of FIG. 2) and a dummy packet insertion means (108 of FIG. 2) for transmitting a dummy packet in the absence of packets for transmission. The exchange counterpart contention means controls the partner (or destination) of exchange. Each output device is made up of an optical/electrical converting means (113 of FIG. 3), serial/parallel converting means (114 of FIG. 3) and packet eliminating means (115 of FIG. 3).

The term "means" used herein generally denotes "unit", "module" or "functional element".

The exchange counterpart contention resolution means (103 of FIG. 1) judges contention among respective output devices, from a destination address and a connection request signal from the input device, sets a connection pattern (or mode) for an optical switch from the result of contention resolution, sends an optical switch control signal to optical switch control means (104 of FIG. 1) and sets a connection pattern for connecting an output device not required for connection to any one of the input devices. The optical switch control means controls the optical switch in accordance with the connection pattern to connect the input and output devices. The exchange counterpart contention resolution means (103 of FIG. 1) sends a packet discarding control signal to packet eliminating means (115 of FIG. 3) of an output device not required for connection to eliminate the dummy packet.

The schematics of the operation of the embodiment of the invention are explained. Transmission packets sent from a sender station are buffered in the input devices. Every input device sends a destination address and a connection request signal to the exchange counterpart contention resolution means. The exchange counterpart contention resolution means then judges contention among the output devices, from the destination addresses and the connection request signals from the input devices, and sends a connection permission signal to an input device which won the contention without sending the connection permission signals to an input device which lost the contention or which has sent no connection request signal. The input device which received the connection request signal outputs a transmission packet to the optical switch. The input device which has received no connection permission signal selects outputting of the dummy packet insertion means, while it buffers the transmission packet, and outputs the dummy packet to the optical switch.

The exchange counterpart contention resolution means sets an optical switch connection pattern (mode) from the result of decision of contention and sends an optical switch control signal to the optical switch control means, while setting a connection pattern to an output device not required to be connected so that this output device will be connected to any one of the input devices. The optical switch control means controls (governs connection of) the optical switch in accordance with a connection pattern as set to interconnect input and output devices. The exchange counterpart contention resolution means sends a packet discarding signal to an output device not required to be connected so that the output device not required to be connected is connected to some input device to receive a dummy packet or a packet addressed to another output device. On reception of a packet discarding signal from the exchange counterpart contention resolution means, the packet eliminating means of the output device deems that the received packet is not addressed to itself and discards same. Thus, there is no risk of delivery of packets or dummy packets addressed to anther reception station to the reception station under consideration to realize normal exchange operations.

In a preferred embodiment, an optical switch of the present invention includes plural transmitters having variable wavelength electrical/optical converting means (860 of FIG. 20) and address decoding means (861 of FIG. 20), and a plurality of receivers (receivers), having optical combining/splitting means (864 of FIG. 20), fixed wavelength filter means (862 of FIG. 20) and optical/electrical converting means (O/E 863 of FIG. 20), in which there is further provided an address conversion circuit (865 of FIG. 20) for converting an address to be accorded to the address decoding means from a sender address for a receiver to a destination address for a transmitter.

In another preferred embodiment, an optical switch of the present invention includes a plurality of transmitters comprised of fixed wavelength electrical/optical converting means E/O (866 of FIG. 21) having different wavelengths allocated to respective transmitters and a plurality of receivers comprised of optical combining/splitting units (864 of FIG. 21), optical/electrical converting means (863 of FIG. 21) and an address decoder (868 of FIG. 21), in which there is further provided address conversion means (865 of FIG. 21) for converting an address to be accorded to address decoding means from a destination address for a transmitter to a sender address for a receiver.

In yet another preferred embodiment, an optical switch of the present invention includes the followings:
(a) M groups of variable wavelength electrical/optical converting means, each of the groups having N variable wavelength electrical/optical converting means (E/O 871 of FIG. 22) each outputting an optical signal of any one of M different wavelengths λ1, λ2, ..., λM, M and N being integers not less than 2,
(b) M-number of N×K-optical spatial switch means for switching paths of N optical output signals of one group of the variable wavelength electrical/optical converting means, K being an integer not less than 2,
(c) K-number of optical combining/splitting means (876 of FIG. 22) for combining optical signals from respective different output ports of the M-number of N×K-optical spatial switch means for splitting the combined signal into M-number of outputs,
(d) MK-number of fixed wavelength filter means (877 of FIG. 22), and
(e) MK-number of optical/electrical converting means (O/E 878 of FIG. 22).
(f) The optical spatial switch includes;
  (f1) N optical splitting means branching into K branches (873 of FIG. 22);
  (f2) optical gate means (874 of FIG. 22) for turning optical signals branched by the optical splitting means on/off; and
  (f3) K optical combining means (875 of FIG. 22) for combining optical signals from N different optical branching means. The optical switch further includes address decoding means (872 of FIG. 22) for controlling the variable wavelength electrical/optical converting means and one of the optical gate means connected to the optical splitting means in accordance to the description address for the transmitter.

DETAILED DESCRIPTION OF THE PREFERRED EMBODIMENTS

Referring to the drawings, preferred examples of the present invention will be explained for further detailed explanation of the above-described embodiments for carrying out the present invention and modifications thereof.

EXAMPLE 1

A first example of the present invention will be explained with reference to FIGS. 1 to 4, 24, 25 and 37. FIG. 1 shows the configuration of the first example of the present invention. The preset example is an optical packet exchange apparatus in which the second aspect of the invention is applied to the first aspect of the invention and comprised of the input side of four channels and the reception side of four channels. Referring to FIG. 1, the optical packet exchange apparatus includes four input units 101, an optical switch 100, four output units 102, a contention resolution circuit 103, and an optical switch control circuit 104.

Figure 37:
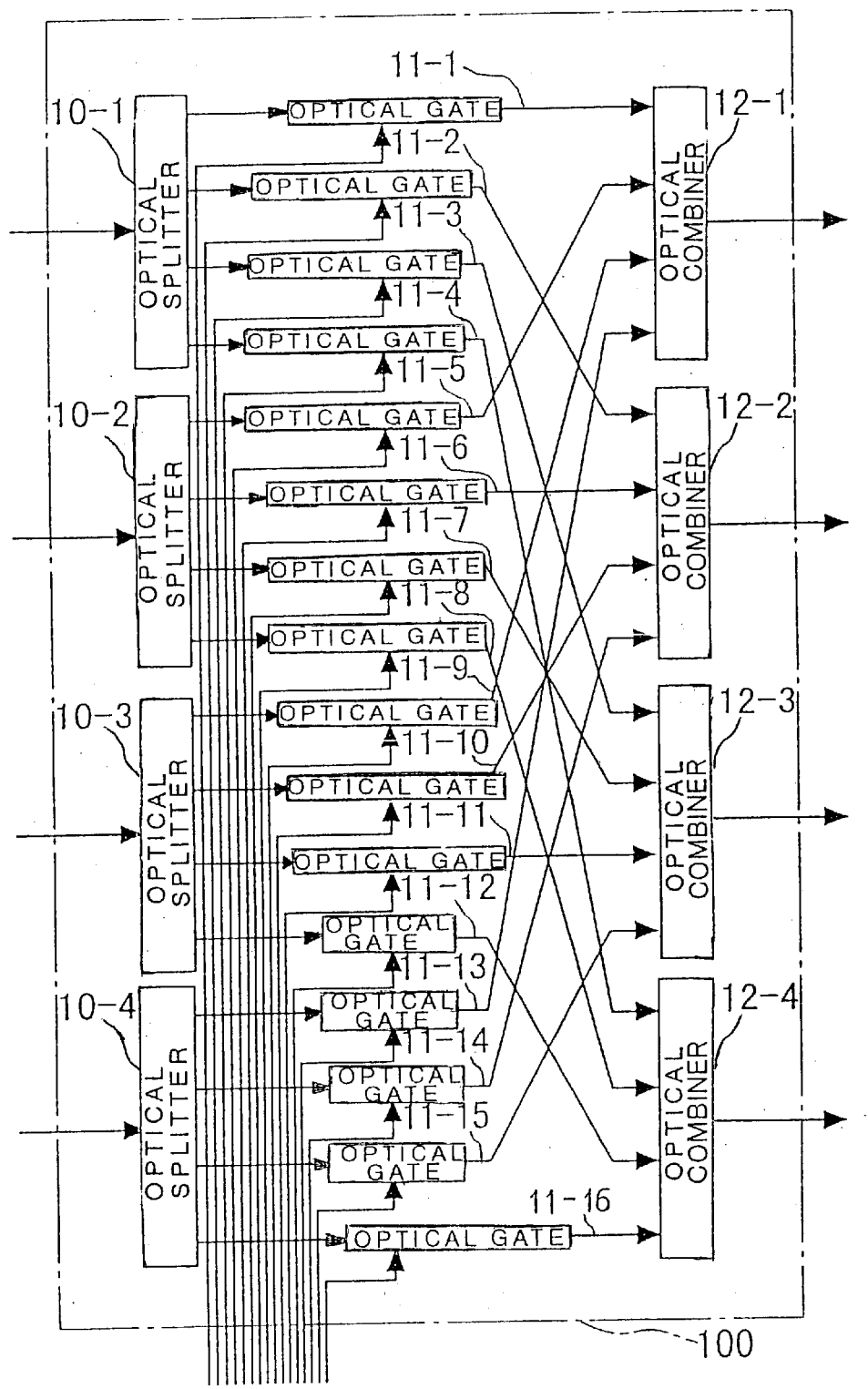
FIG. 37 illustrates the structure of optical switches in Examples 1 to 7 and 12 to 15.

FIG. 37 shows an illustrative structure of an optical switch 100. Referring to FIG. 37, the optical switch 100 is a splitter/combiner type optical switch of four input channels and four output channels comprised of four optical splitters 10, 16 optical gates 11 and four optical combiners 12. The optical gate 11 is a semiconductor light amplifier which, upon application of current, is turned on to transmit light signals and which, upon non-applying current, is turned off to interrupt light signals.

The input light signals are split (branched) into four by the optical splitters 10 to fall on the four optical gates 11 connected in circuit. By turning an optional one of the optical gates 11 on by a control signal, the light signal entered via the input port is output to an output port via any one of optional optical combiners 12. In this manner, the optical switch 100 can switch the route (optical path) of the light signal entered via the input port by the control signal to output the switched light signal at an optional output port.

Figure 24:
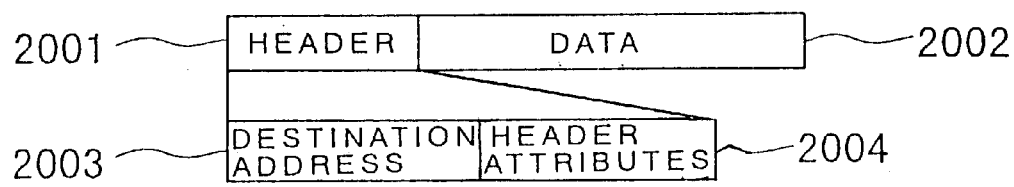
FIG. 24 shows the structure of a packet.

FIG. 24 shows an illustrative data format of a packet exchanged by the packet exchange apparatus. The packet is made up of a header part 2001, composed of the destination address information 2003 and the header attribute information 2004, and a data part 2002.

The operation of the optical packet exchange apparatus of the first example, in its entirety, is explained with reference to FIG. 1.

The transmission packet, sent from a sending station, is buffered by input units 101. Each of the input units 101 sends a destination address 1003 of the transmission packet and a connection request signal 1004 to a comprehensive contention resolution circuit 103.

The contention resolution circuit 103 receives destination addresses 1003-1 to -4 and connection request signals 1004-1 to -4 from the input units 101-1 to -4 and judges contention as to the output units 102-1 to -4 to send a connection permission signal 1005-1 to -4 to any of the input units which has won the contention, respectively. The contention resolution circuit 103 does not send the connection permission signals 1005 to the input units which have lost the contention or which have not sent the connection request signals.

Any of the inputs unit 101 which has received the connection permission signal 1005 outputs the transmission packet to the optical switch 100. The input unit 101 which has not received the connection permission signal 1005 outputs a dummy packet to the optical switch 100 while buffering the transmission packet.

The contention resolution circuit 103 sets a connection pattern for the optical switch 100 based on the results of decision of the contention to send an optical switch control signal 1009 to the optical switch control circuit 104, while setting another connection pattern to connect any of output units 102, for which the connection request has not been made, to one of the input units 101.

The optical switch control circuit 104 controls the optical switch 100 in accordance with the applied connection pattern to interconnect the input unit 101 and the output unit 102.

On the other hand, the contention resolution circuit 103 sends a packet discarding signal 1008 to the output unit 102 for which the connection request has not been made. The output unit 102, for which the connection request has not been made, is connected to one of the input units 101 to receive the dummy packet or a packet addressed to another output unit. On reception of the packet discarding signal 1008 from the contention resolution circuit 103, the output unit 102 can discard the received packet based on judgment that the received packet is not a packet addressed to the output unit 102 concerned. Thus, the exchange operation can be performed regularly without delivery through error to a receiving station under consideration of a packet addressed to another receiving station or dummy packet.

Figure 25:
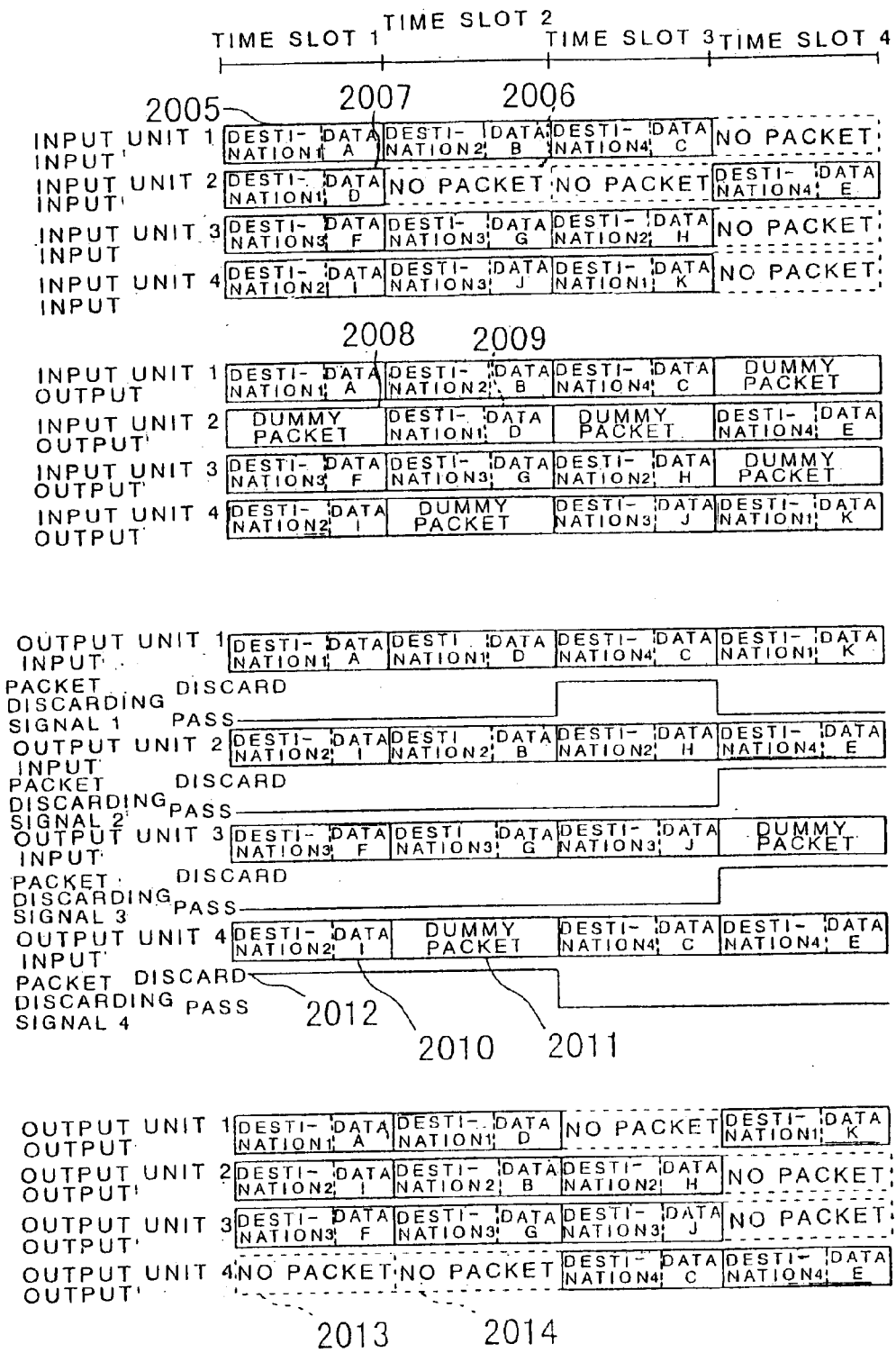
FIG. 25 is a timing chart of packet switching for illustrating the operation of Example 1.

FIG. 25 shows, by way of an example, an exchange operation of 4-time slot time in case of sending packets from four sending stations to four receiving stations. Referring to FIG. 25, in a packet 2005 as an exchange unit, a destination 1 represents the number of a receiving station, that is a destination address, and data A represents transmission data of the packet. NO PACKET at 2006 represents a time slot in which no packet has been sent from the sending station.

A packet 2005 and a packet 2007, addressed in the first time slot to the same output station 1, are entered to the input unit 1 and to the input unit 2, respectively.
(First Paragraph)

The contention resolution circuit 103 judges contention between the (two) packets 2005 and 2007 to accord a connection permission signal to the input unit 1 which then outputs the packet 2005, whereas the input unit 2 outputs a dummy packet. The packet 2007 acquires a connection permission signal in the second time slot so as to be output as packet 2009. (Second paragraph) In the first time slot, packets are output to the destinations 1, 2 and 3. However, there is no packet addressed to destination 4. If there is no packet to be received by the output unit, a command is issued to connect the output unit 1 to any one of the input units.

In the present example, if there is no packet to be received, a command is issued to connect the output unit 1 to the input unit 1, to connect the output unit 2 to the input unit 2, to connect the output unit 3 to the input unit 3, and to connect the output unit 4 to the input unit 4. That is, if there is no packet addressed to the destination 4, the output unit 4 is connected to the input unit 4 so that a packet 2010 is entered. Since the contention resolution circuit 103 accords a packet discarding signal 2012 to the output unit 4, the output unit 4 discards the packet 2010 so that the output to the output unit 4 is NO PACKET at 2013.

In the second time slot, the output unit 4 is similarly connected to the input unit 4 to receive a dummy packet 2011 which, however, is discarded, so that an output to the output unit 4 is NO PACKET at 2014.

In the preset example, the output unit devoid of the packet to be received is connected to the input unit of the same number. However, it is optional to which input number connection is to be made such that connection may be made to a particular input unit. If all output units having no packet to be received are connected to the same input unit, it is unnecessary for the remaining input units to output dummy packets for achieving stable operation of the output units. However, dummy packets may be output for stable operation of the input units or the optical switch.

In FIG. 25, time slots for inputs of the input units, outputs from the input units, inputs of the output units and outputs from the output units are shown in an aligned state for convenience. However, there are occasions wherein the temporal positions of the respective time slots are deviated slightly due to processing delay in the various portions or signal propagation delay.

Figure 2:
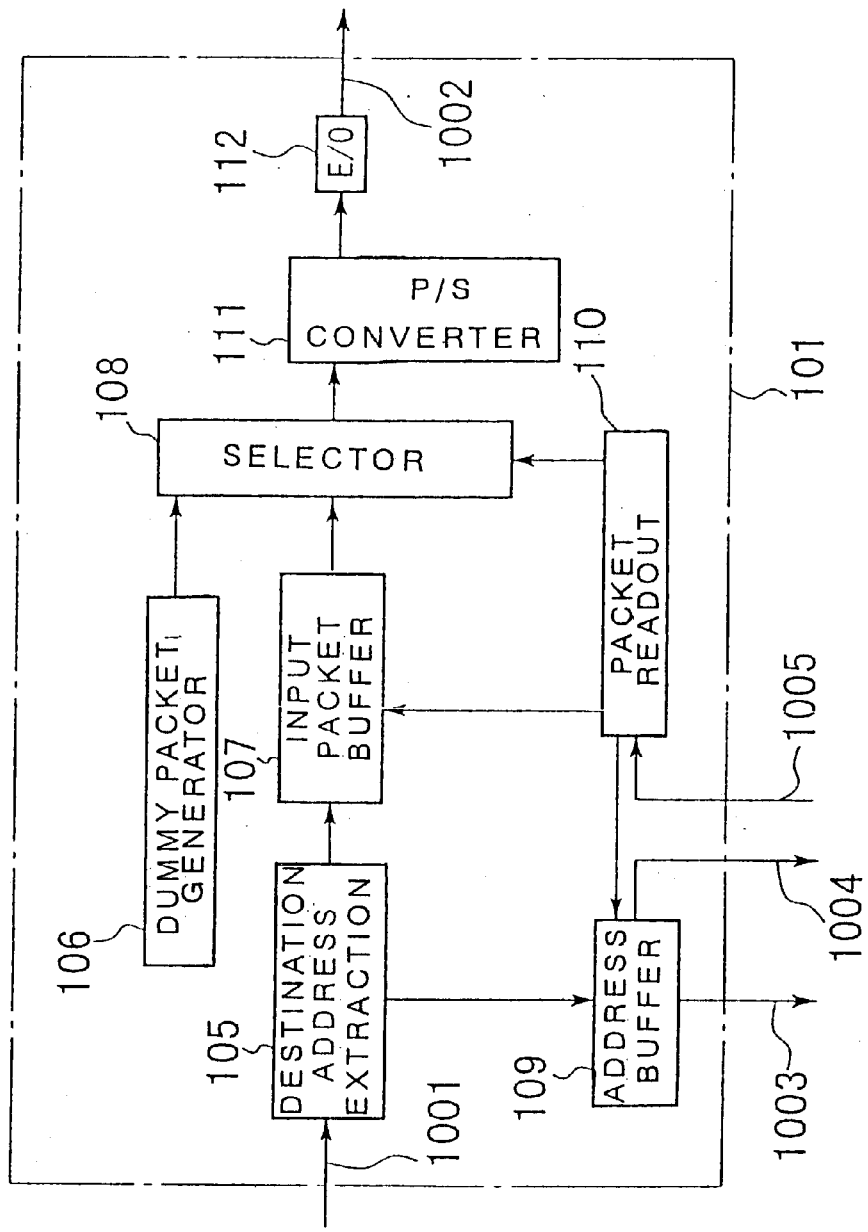
FIG. 2 illustrates the structure of input units in Examples 1, 3, 5 and 6.

FIG. 2 shows an illustrative structure of an input unit 101 in the present example. Referring to FIG. 2, the input unit 101 in the preset example is made up of a destination address extraction circuit 105, a dummy packet generating circuit 106, an input packet buffer 107, a selector 108, an address buffer 109, a packet readout circuit 110, a parallel/serial converter 111 and an electro-optical converter 112.

The destination address extraction circuit 105 extracts a destination address of an input packet signal 1001 to buffer the address at the address buffer 109 while buffering the packet at the input packet buffer 107.

The address buffer 109 outputs a destination address signal 1003 and a connection request signal 1004 to the contention resolution circuit.

On reception of the connection permission signal 1005 from the contention resolution circuit 103 (see FIG. 1), the packet readout circuit 110 erases a corresponding address in the address buffer 109, while taking out a corresponding packet from the input packet buffer 107 to control the selector to output the packet to the parallel/serial (P/S) converter 111.

The parallel/serial converter 111 parallel/serially converts the packet signal. The electro-optical converter (E/O) 112 converts the serial signals into a light signal 1002 which is output to the optical switch.

In the absence of the connection permission signal 1005, the packet readout circuit 110 controls the selector 108, without moving the information in the address buffer 109 and the input packet buffer 107, in order to output the dummy packet generated by the dummy packet generating circuit 106 to the parallel/serial converter 111. This dummy packet is converted by the parallel/serial converter 111 and the electro-optical converter 112 into a light signal 1002 which is output to the optical switch 100 (see FIG. 1).

Figure 3:
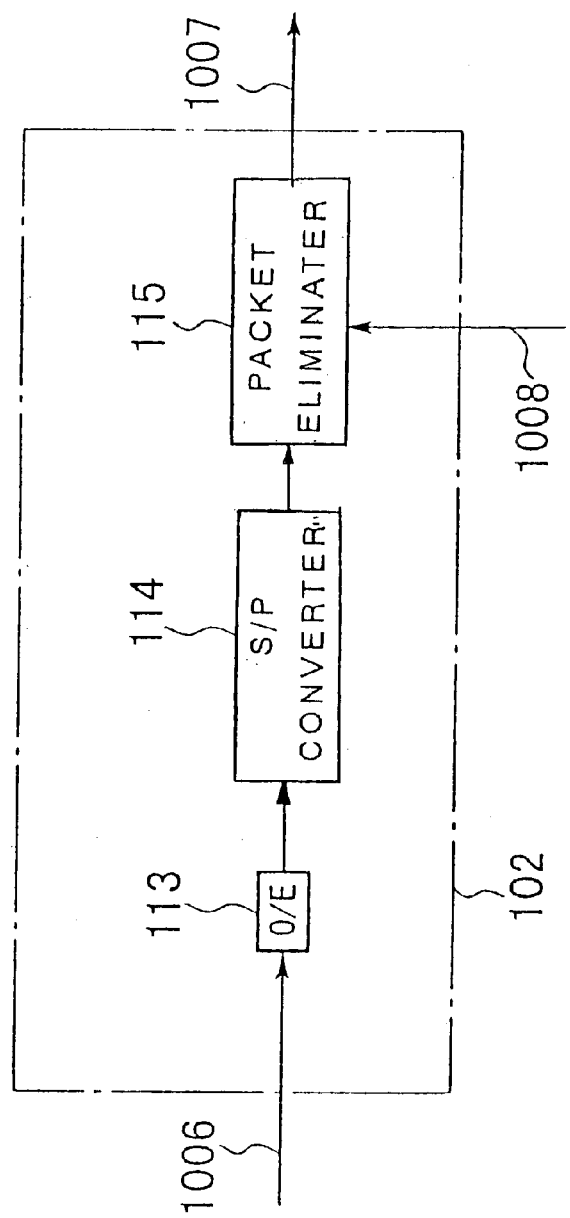
FIG. 3 illustrates the structure of output units in Examples 1 and 2.

FIG. 3 shows an illustrative structure of a sole output unit 102 in the present example. Referring to FIG. 3, the output unit 102 is made up of an optical/electrical converter 113, a serial/parallel (S/P) converter 114 and a packet eliminating circuit 115. The light signal 1006, supplied from the optical switch 100 (see FIG. 1), is converted by the optical/electrical converter 113 into electrical signals and converted by the serial/parallel converter 114 to parallel signals which are fed to the packet eliminating circuit 115. If the packet discarding signal 1008 is sent by the contention resolution circuit 103 (see FIG. 1) to the packet eliminating circuit 115, the packet is discarded, with an output packet signal 1007 being then a packet absent signal. In the absence of the packet discarding signal 1008, the packet signal received at the output packet signal 1007 is output.

Figure 4:
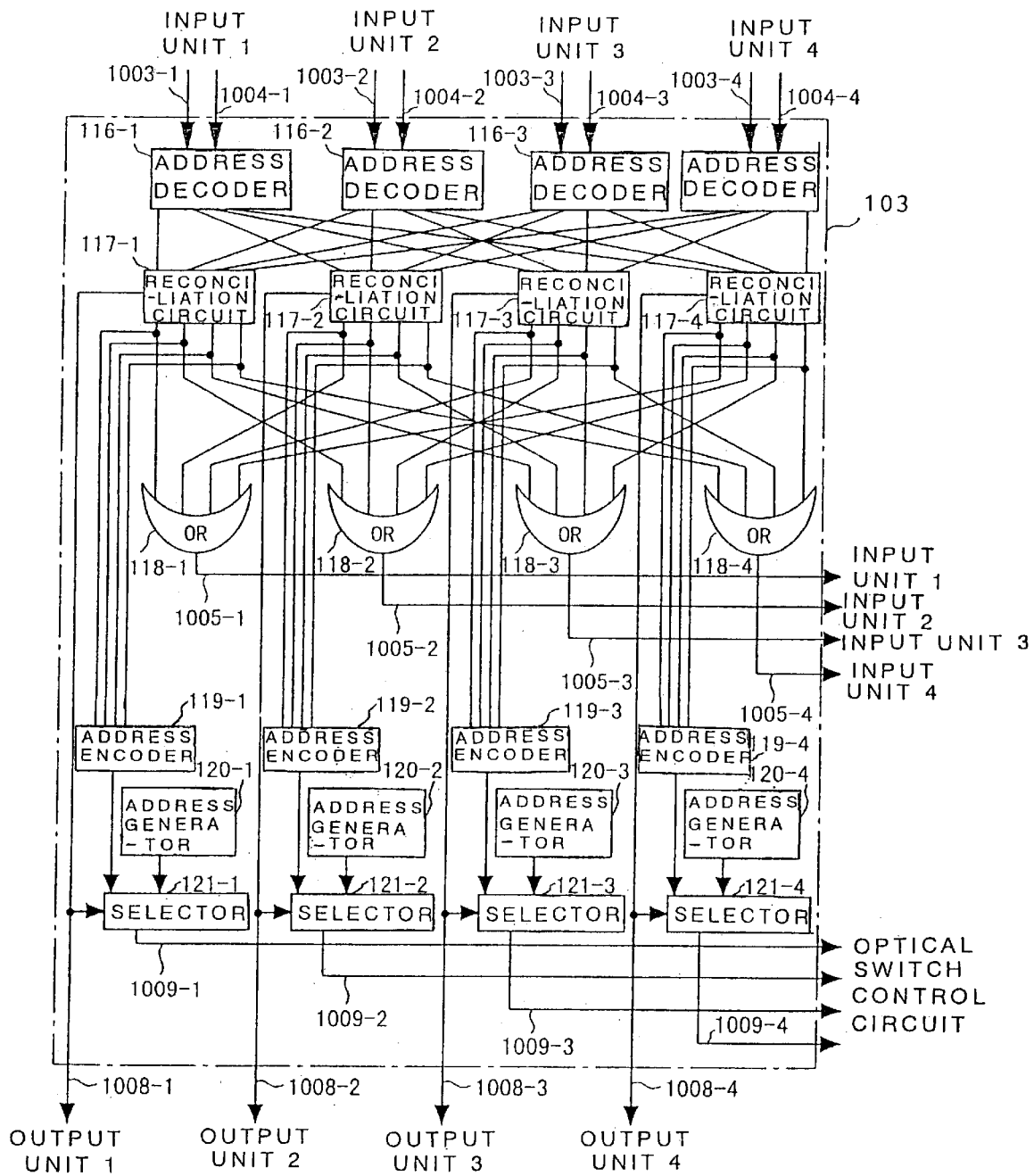
FIG. 4 illustrates the structure of a contention resolution circuit in Examples 1 to 4.

FIG. 4 shows an illustrative structure of the contention resolution circuit 103. Referring to FIG. 4, the contention resolution circuit 103 is made up of address decoders 116-1 to -4, conciliation circuits 117-1 to -4, OR gates 118-1 to -4, address encoders 119-1 to -4, address generators 120-1 to -4 and selectors 121-1 to -4.

On reception of a destination address signal 1003 and a connection request signal 1004, the address decoder 116 decodes the destination address to send a connection request signal to the reconciliation circuit 117 associated (corresponding) with the destination.

The reconciliation circuit 117 receives a connection request signal for connecting to an output unit associated with the reconciliation circuit from each input unit to determine to which of the input units required for connection should be accorded, followed by outputting a connection permission signal to the OR gate 118 and to the address encoder 119.

The OR gate 118 ORs the connection permission signals associated with the respective input units of the reconciliation circuits to accord the connection permission signals 1005 to the respective input units.

The address encoder 119 encodes a connection permission signal from one of the reconciliation circuit 117 into an address to acquire an address of the input unit to which each output unit should be connected. This address is output as an optical switch control signal 1009 via selector 121 to an optical switch control circuit.

In the absence of the connection request signal to the reconciliation circuit 117, that is if there is no packet to be received by the output unit associated with the reconciliation circuit concerned, the reconciliation circuit 117 controls the selector 121 based on the selector control signal to output an address generated by the address generator 120 as an optical switch control signal 1009 to the optical switch control circuit while according a selector control signal as a packet discarding signal 1008 to a corresponding output unit.

EXAMPLE 2

Figure 5:
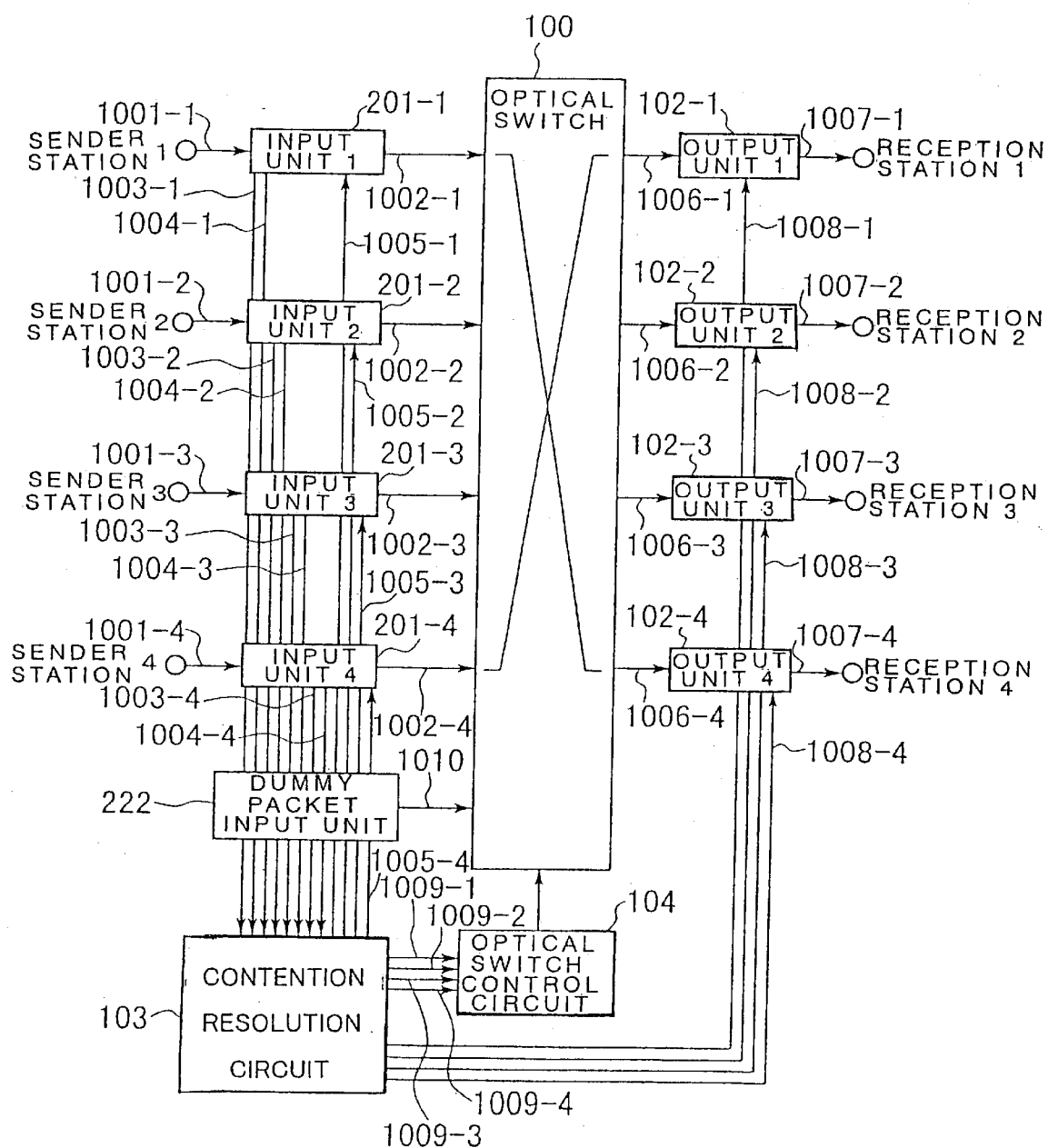
FIG. 5 illustrates the structure of Example 2.

Referring to FIGS. 3 to 7, a second example is explained. FIG. 5 shows the structure of the second example. This example is directed to an optical packet exchange apparatus for the 4 transmission channels and 4 reception channels practicing the fourth aspect of the present invention. Referring to FIG. 5, the packet exchange apparatus is comprised of four input units 201, an optical switch 100, four output units 202, a contention resolution circuit 103, an optical switch control circuit 104 and a dummy packet input unit 222.

First, the operation of the optical packet exchange apparatus of the second example in its entirety is explained with reference to FIG. 5.

Transmission packets, sent from the sending station, are buffered at the input units 201. The input units 201 each send a destination address 1003 of the transmission packet and a connection request signal to the contention resolution circuit 103. The contention resolution circuit 103 receives the destination addresses 1003-1 to -4 and the connection request signals 1004-1 to -4 from the respective input units 201-1 to -4 to judge the contention for the output units 102-1 to -4 to send connection permission signals 1005-1 to -4 to any of the input units that won the contention. To the input units that lost the contention or to the input units that sent no connection request signals, no connection permission signal is sent by the contention resolution circuit 103. The input unit 201 that has received the connection permission signal 1005 outputs a transmission packet to the optical switch 100. The input unit 201 that has received no connection permission signal 1005 keeps the transmission packet buffered.

The contention resolution circuit 103 sets a connection pattern of the optical switch 100 from the results of the judgment of contention and sends an optical switch control signal to the optical switch control circuit 104, while setting a connection pattern to the output unit 102 not required for connection so that the output unit(s) 102 will be connected to the dummy packet input unit 222.

On the other hand, the contention resolution circuit 103 sends a packet discarding signal 1008 to the output unit(s) 102 not required for connection.

Any of the output units 102, not required for connection, is connected to the dummy packet input unit 222 to receive a dummy packet. It is noted that, on reception of the packet discarding signal 108 from the contention resolution circuit 103, the output unit 102 can discard a received packet based on judgment that the received packet is not addressed to itself. Thus, the exchange operation can be executed regularly without a dummy packet being erroneously sent to the receiving station.

A 4-by-4 (4×4) optical switch 100 operates in the same manner as the 4-by-4 optical switch 100 of the first example.

Figure 6:
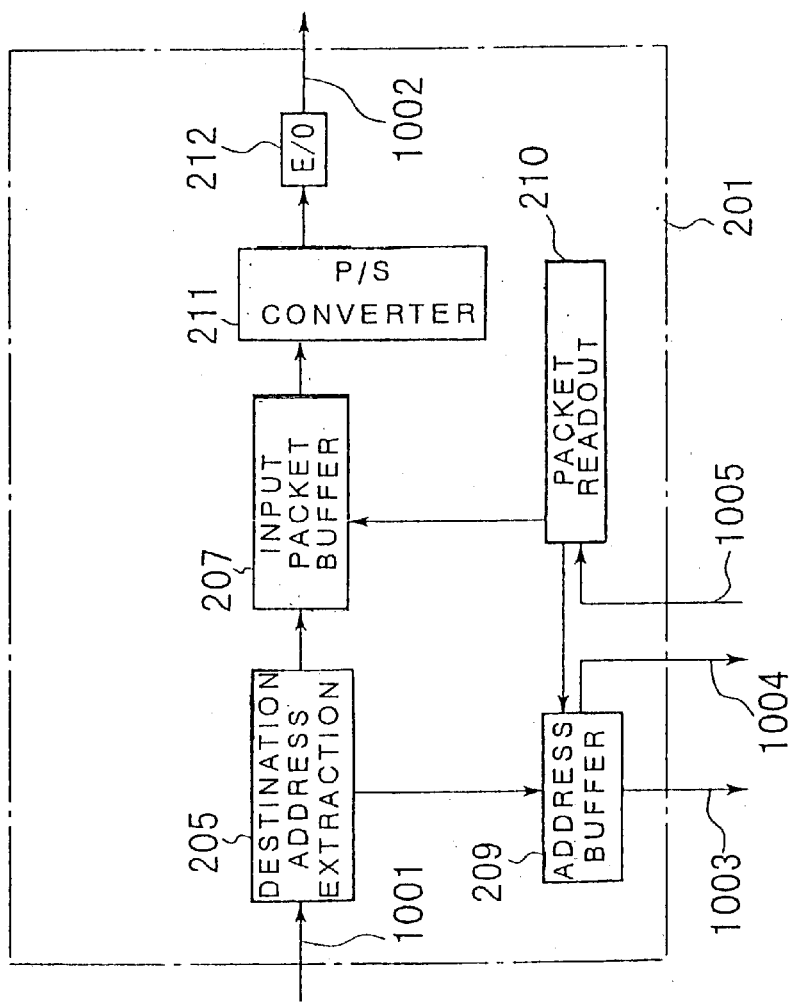
FIG. 6 illustrates the structure of input units in Examples 2, 4 and 7.

FIG. 6 shows an illustrative structure of an input unit 201. In this figure, the input unit 201 is made up of a destination addresses extraction circuit 205, an input packet buffer 207, an address buffer 209, a packet readout circuit 210, a parallel/serial (P/S) converter 211 and an electro-optical (E/O) converter 212.

The destination address extraction circuit 205 extracts a destination addresses of the input packet signal 1001 to buffer the address in the address buffer 209 and to buffer packets in the input packet buffer 207. The address buffer 209 outputs a destination address signal 1003 and a connection request signal 1004 to the contention resolution circuit.

On reception of a connection request signal 1005 from the contention resolution circuit 103 (see FIG. 5), the packet readout circuit 210 erases a corresponding address in the address buffer 209 and takes out the corresponding packet from the input packet buffer 207 to output the packet to the parallel/serial converter 211. The parallel/serial converter 211 parallel-serial-converts the packet signal. The electro-optical converter 212 converts the serial signal into an optical signal 1002 which is output to the optical switch 100 (see FIG. 5).

If no connection request signal 1005 is obtained, the packet readout circuit 210 does not move the information in the address buffer 209 or in the input packet buffer 207. Although the input packet buffer 207 is not required to make any output, it is also possible for the input packet buffer 207 to output an optional pattern for stabilization of the electro-optical converter 212 or the optical switch, then to convert the pattern by parallel/series conversion by the parallel/serial converter 211, and to convert the converted pattern to an optical signal 1002 which is output to the optical switch.

Figure 7:
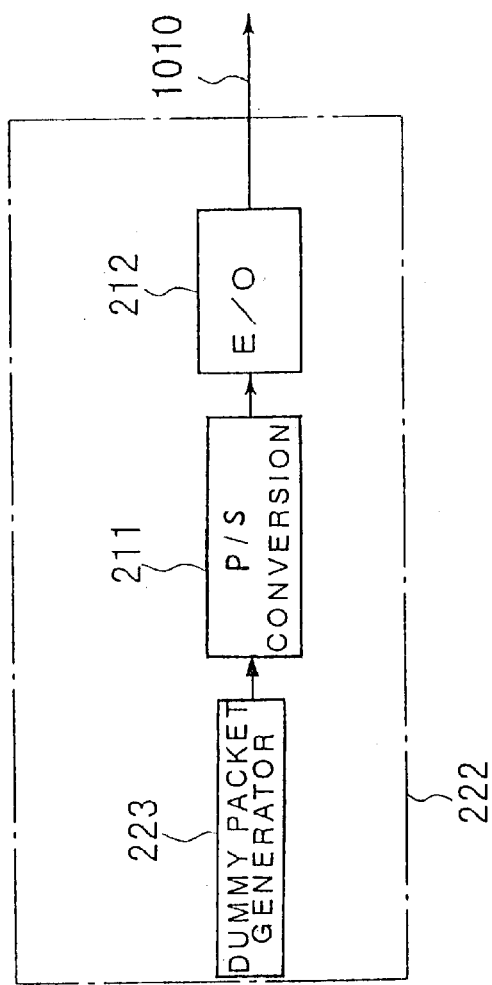
FIG. 7 shows the structure of dummy packet input units in the Examples 2 and 4.

Referring to FIG. 7 showing an illustrative structure of the dummy packet input unit 222, the dummy packet input unit 222 includes a dummy packet generator 223, a parallel/serial (P/S) converter 211 and an electro-optical converter (E/O) 212.

A dummy packet data generated by the dummy packet generator 223 is fed to the optical switch 100 as a light signal converted to a serial signal by the parallel/serial converter 211 and the electro-optical converter 212.

FIG. 3 shows an illustrative structure of a sole output unit 102 in the present example. In the present second example, an output unit identified with the output unit 102 explained with reference to the first example is used. That is, referring to FIG. 3, the output unit 102 is made up of an optical/electrical converter 113, a serial/parallel converter 114 and a packet eliminating circuit 115.

An optical signal 1006, fed from the optical switch 100 (see FIG. 5), is converted by the optical/electrical converter 113 into an electrical signal which is converted by the serial/parallel converter 114 so as to be fed to the packet eliminating circuit 115.

If a packet discarding signal 1008 is sent to the packet eliminating circuit 115 by the contention resolution circuit 103 (see FIG. 5), the packet is discarded and the output packet signal is devoid of packet. If no packet discarding signal 108 is sent, the received packet signal is output as an output packet signal 1007.

FIG. 4 shows an illustrative structure of the contention resolution circuit 103. In this second example, a contention resolution circuit which is the same as the contention resolution circuit 103 explained with reference to the first example is used. That is, referring to FIG. 4, the contention resolution circuit 103 is made up of address decoders 116-1–4, conciliation circuits 117-1 to -4, OR gates 118-1 to -4, address encoders 119-1 to 4, address generators 120-1 to -4 and selectors 121-1 to -4.

On reception of a destination address signal 1003 and a connection request signal 1004 from the respective input units, the address decoder 116 decodes the destination address to send a connection request signal to the reconciliation circuit 117 (see FIG. 5) associated with the destination. The reconciliation circuit 117 receives the connection request signal to the output unit associated with the reconciliation circuit from each of the input units to determine to which of the input units required for connection the connection permission should be accorded to output a connection permission signal to the OR gate 118 and to the address encoder 119. The OR gate 18 logically sums the connection permission signals associated with the respective input units of the reconciliation circuits to accord a connection permission signal 1005 to the respective input units. The address encoder 119 encodes the connection permission signal from one of the reconciliation circuits 117 into an address to acquire an address of the input unit to which respective output unit should be connected. This address is output as an optical switch control signal 1009 via selector 121 to an optical switch control circuit.

In the absence of the connection request signal in the reconciliation circuit 117, that is if there is no packet to be received by the output unit associated with the reconciliation circuit, the reconciliation circuit 117 controls the selector 121 by a selector control signal to output the address of the dummy packet input unit 222 generated by the address generator 120 as an optical switch control signal 1009 to the optical switch control circuit. The reconciliation circuit 117 also accords a selector control signal as a packet discarding signal 1008 to an associated output unit.

EXAMPLE 3

Figure 8:
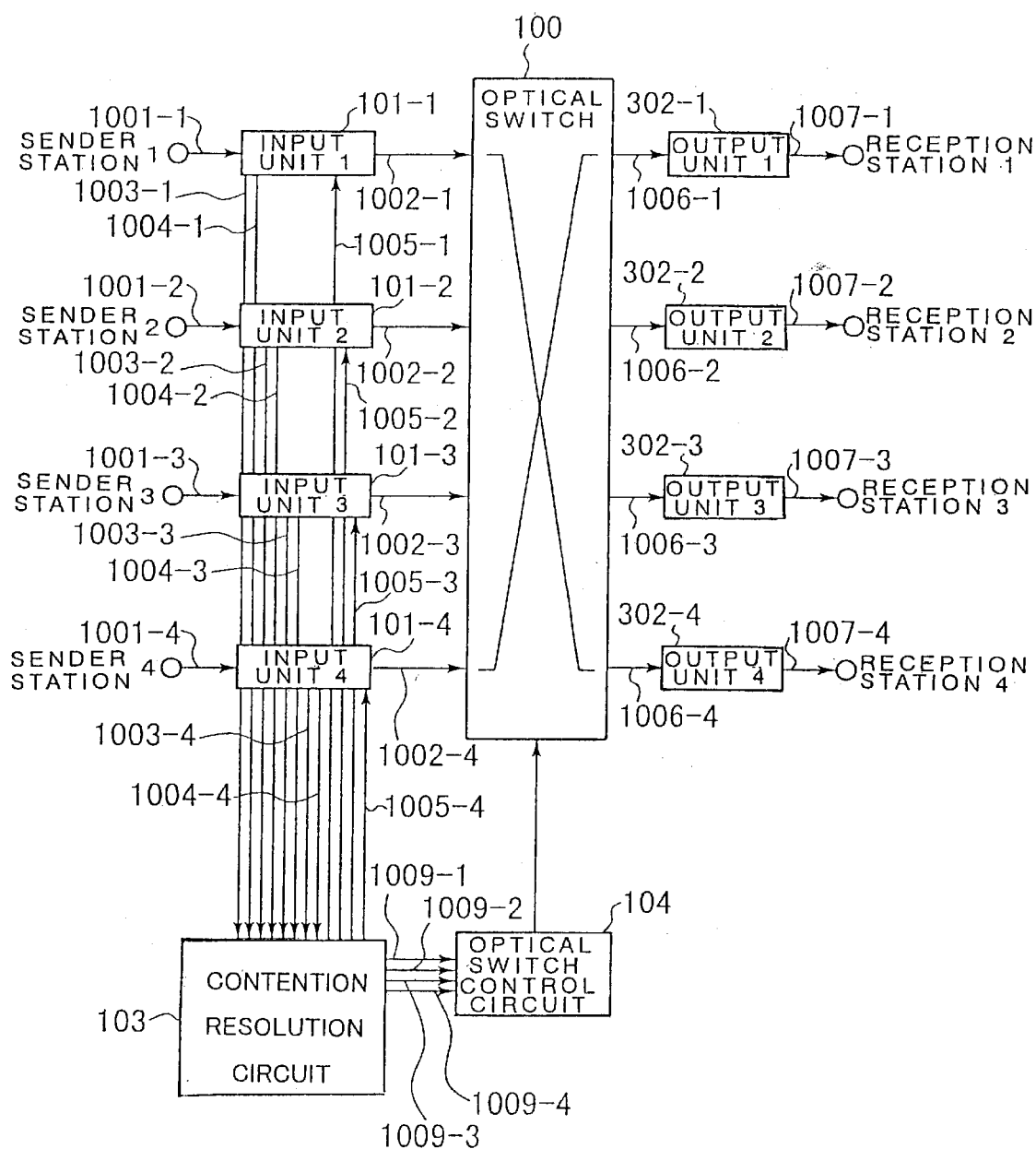
FIG. 8 shows the structure of Example 3.
Figure 10:
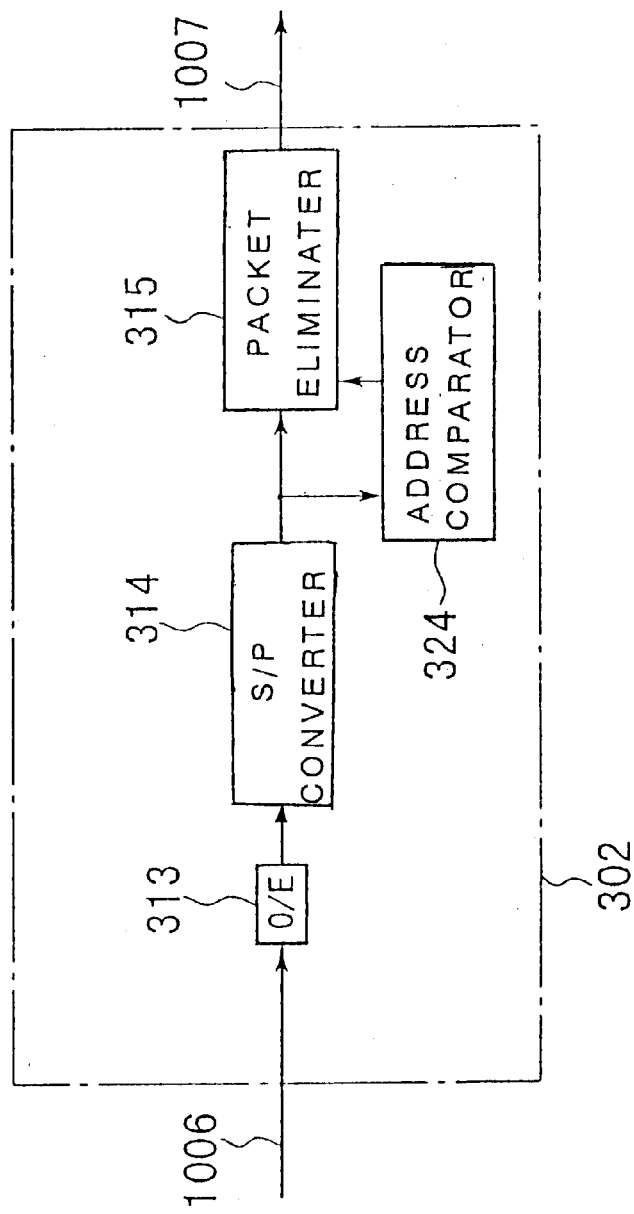
FIG. 10 shows the structure of output units in Examples 3 and 4.

Referring to FIGS. 8 and 10, a third example is explained. FIG. 8 shows the structure of the third example. This example is directed to an optical packet exchange apparatus for the 4 transmission channels and 4 reception channels practicing the fifth aspect of the present invention to which the sixth and eighth aspects of the invention have been applied. Referring to FIG. 8, the packet exchange apparatus is comprised of four input units 101, an optical switch 100, four output units 302, a contention resolution circuit 103, and an optical switch control circuit 104.

First, the operation of the optical packet exchange apparatus of the third example in its entirety is explained with reference to FIG. 8.

Referring to FIG. 8, the transmission packet, sent from the sending station, is buffered at the input unit 101. The input unit 101 sends a destination address 1003 of the transmission packet and a connection request signal 1004 to the contention resolution circuit 103. The contention resolution circuit 103 receives destination addresses 1003-1 to -4 and connection request signals 1004-1 to -4 from the respective input units 101-1 to -4 to judge the contention for the output units 302-1 to -4 to send a connection permission signal 1005-1 to -4 to any of the input units that won the contention. To the input units that lost the contention or to the input units that sent no connection request signals, no connection permission signals are sent by the contention resolution circuit 103.

The input unit 201 that has received the connection permission signal 1005 outputs a transmission packet to the optical switch 100. The input unit 201 that has not received the connection permission signal 1005 outputs the dummy packet to the optical switch 100 while it keeps the transmission packet buffered.

The contention resolution circuit 103 sets a connection pattern of the optical switch 100 from the results of the judgment of contention and sends an optical switch control signal 1009 to the optical switch control circuit 104, while setting a connection pattern to the output unit 102 not required for connection so that the output unit 302 will be connected to any one of the input units 101. The output unit 302, not required for connection, is connected to some input unit 101 to receive a dummy packet or a packet addresses to some other output unit. However, since the output unit 302 extracts the destination address information of the received packet to compare it with its own address while discarding the packet having the destination addresses different from its own address, the exchange operation can proceed regularly without erroneously sending packets or dummy packets to other reception stations.

The destination addresses information in a dummy packet is set so that it is not coincident with the address of the output unit to which the dummy packet is sent. For example, it suffices if the address set is not allocated to the output unit. Alternatively, if the connection pattern of the input and output units exchanging the dummy packet has been set, it suffices if the address of the output unit to which the input unit is not connected is used as the destination address.

A 4-by-4 optical switch 100 operates in the same manner as the 4-by-4 optical switch 100 of the first example.

FIG. 10 shows an illustrative structure of an input unit 201 in the instant Example 3. In this figure, the output unit 302 is made up of an optical/electrical converter (O/E) 313, a serial/parallel converter 314, a packet eliminating circuit 315 and an address comparator circuit 324.

An optical signal 1006, fed from the optical switch 100 (see FIG. 8) is converted by the optical/electrical converter 313 into an electrical signal which is converted by the serial/parallel converter 314 so as to be fed to the packet eliminating circuit 315 and to the address comparator circuit 324.

The address comparator circuit 324 extracts the destination address information of the packet header to compare it with the address of its own output unit. The address comparator circuit 324 then issues instructions to the packet eliminating circuit 315 to the effect that either the packet be passed or discarded in case of coincidence or non-coincidence between the packet destination address and the address of its own output unit, respectively.

EXAMPLE 4

Figure 9:
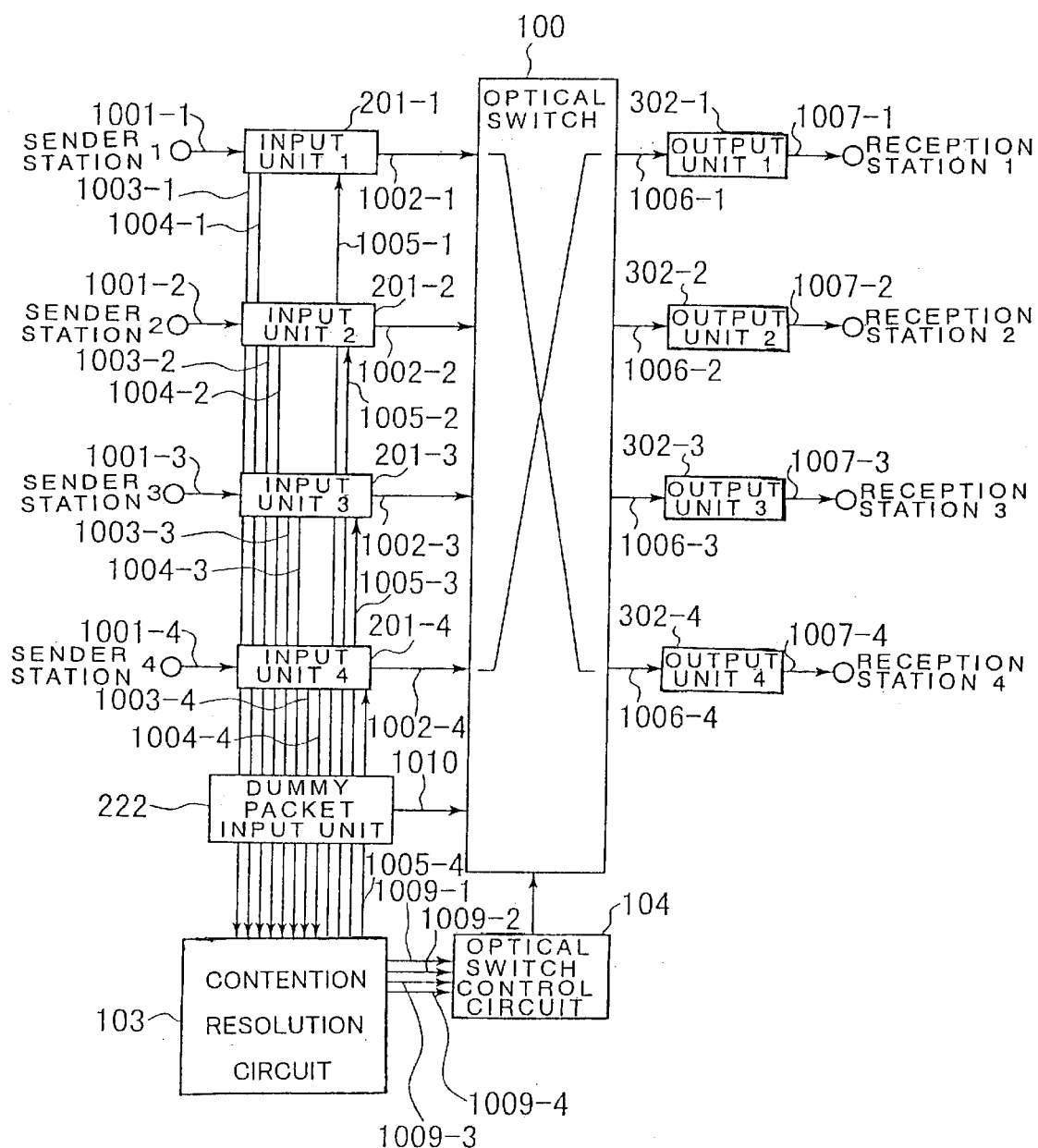
FIG. 9 shows the structure of Example 4.

Referring to FIG. 9, a fourth example of the present invention is explained. FIG. 9 shows a structure of the fourth example. The present example is directed to an optical packet exchange apparatus for four transmission side channels and four reception side channels practicing the ninth aspect of the present invention to which the tenth aspect of the invention is applied. Referring to FIG. 9, the packet exchange apparatus is comprised of four input units 201, an optical switch 100, four output units 302, a contention resolution circuit 103, an optical switch control circuit 104 and a dummy packet input unit 222.

First, the operation of the optical packet exchange apparatus of the fourth example in its entirety is explained with reference to FIG. 9.

Referring to FIG. 9, the transmission packets, sent from the sending station, are buffered at the input unit 201. The input unit 201 sends a destination address 1003 of the transmission packet and a connection request signal 1004 to the contention resolution circuit 103. The contention resolution circuit 103 receives destination addresses 1003-1 to -4 and connection request signals 1004-1 to -4 from the respective input units 201-1 to -4 to judge the contention for the output units 302-1 to 4, then to send connection permission signals 1005-1 to -4 to any of the input units that won the contention. To the input units that lost the contention or to the input units that sent no connection request signals, no connection permission signals 1005 are sent by the contention resolution circuit 103.

The input unit 201 that has received the connection permission signal 1005 outputs a transmission packet to the optical switch 100. The input unit 201 that has not received the connection permission signal 1005 keeps the transmission packet buffered.

The contention resolution circuit 103 sets the connection pattern of the optical switch 100 from the results of the judgment of contention and sends an optical switch control signal 1009 to the optical switch conc 104, while setting a connection pattern to the output unit 302 not required for connection so that the output unit 102 will be connected to the dummy packet input unit 222. The output unit 302 not required for connection is connected to the dummy packet input unit 222 to receive the dummy packet. In the present example, the destination address of a dummy packet fed from the dummy packet input unit 222 is set so as to differ from the totality of the destination addresses allocated to the output units. Then, in the output unit 302, the destination address information of the received packet is compared with its own address to discard the packet not addressed to its own output unit. This assures a regular exchange operation without erroneous delivery of the dummy packet to the receiving station.

A 4-by-4 optical switch 100 operates in the same manner as the 4-by-4 optical switch 100 of the first example.

EXAMPLE 5

Figure 11:
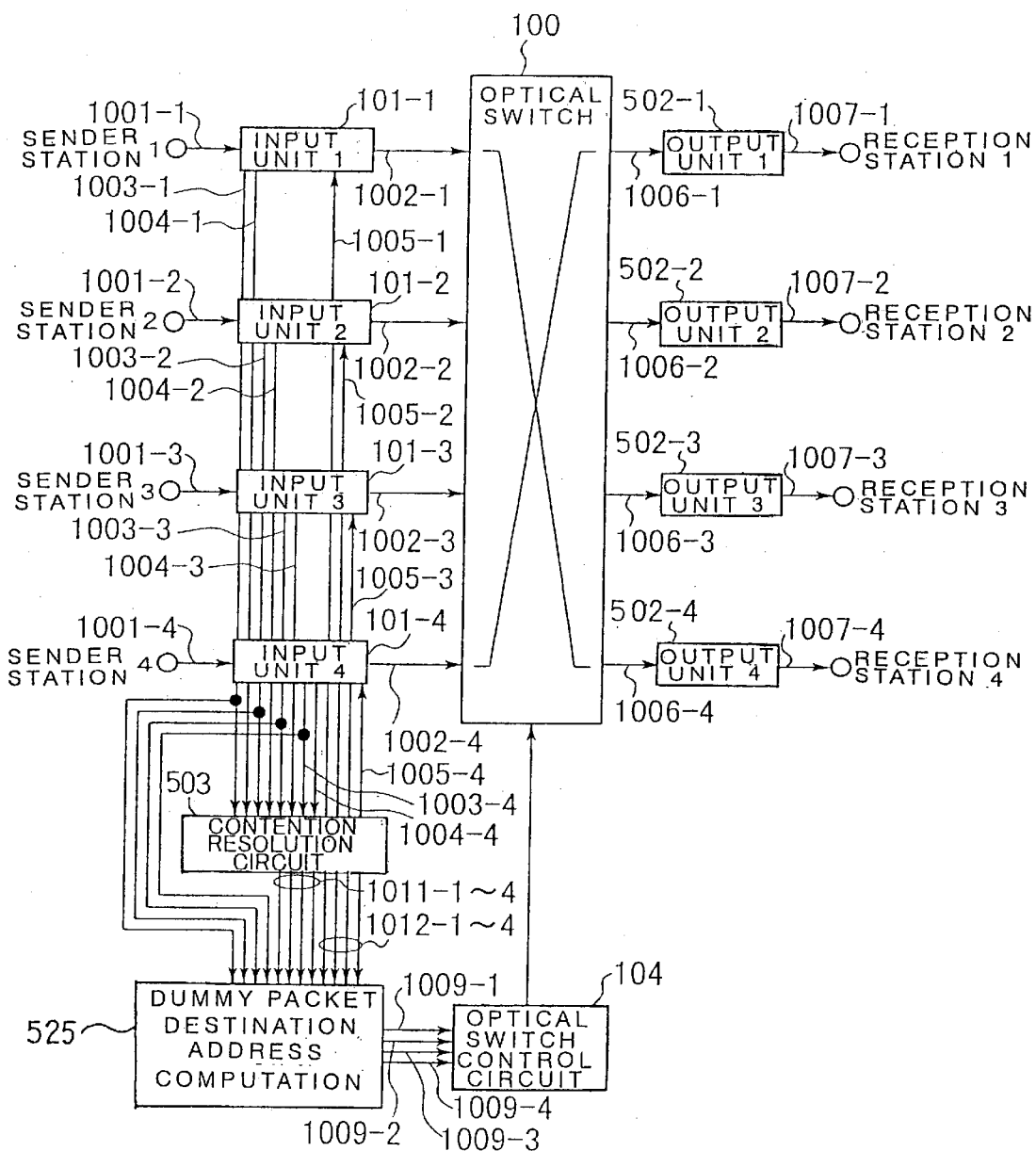
FIG. 11 shows the structure of Example 5.

Referring to FIGS. 11 to 14, a fifth example of the present invention is explained. FIG. 11 shows the structure of the fifth example. The present example is directed to an optical packet exchange apparatus for four transmission side channels and four reception side channels practicing the eleventh aspect of the present invention to which the twelfth aspect of the invention is applied. Referring to FIG. 11, the packet exchange apparatus is comprised of four input units 101, an optical switch 100, four output units 502, a contention resolution circuit 503, a dummy packet destination address calculating circuit 525, and an optical switch control circuit 104.

First, the operation of the optical packet exchange apparatus of the fifth example in its entirety is explained with reference to FIG. 11.

Referring to FIG. 11, transmission packets, sent from the sending station, are buffered at the input units 101. The input unit 101 sends a destination address 1003 of the transmission packet and a connection request signal 1004 to the contention resolution circuit 503. The contention resolution circuit 503 receives the destination addresses 1003-1 to -4 and the connection request signals 1004-1 to -4 from the respective input units 101-1 to -4 to judge the contention among the output units 502-1 to -4 to send a connection permission signal 1005-1 to -4 to any of the input units that won the contention. To the input units that lost the contention or to the input units that sent no connection request signals, no connection permission signal 1005 is sent by the contention resolution circuit 503. The input unit 101 which has received the connection permission signal 1005 outputs the transmission packet to the optical switch 100. The input unit 101 has not received the connection permission signal outputs the dummy packet to the optical switch 100 while it keeps the transmission packet buffered.

The contention resolution circuit 503 sends to the dummy packet destination address calculating circuit 525 an output unit void/full signal 1011 specifying the presence or absence of the connection requests in the output units and the connection request signals to the input units as results of contention resolution.

The dummy packet destination address calculating circuit 525 detects, from the output unit void/full signal 1011 and the connection permission signal 1012, an output unit 502 devoid of packets to be received and an input unit 101 not given the connection permission, and executes calculations to find a pattern interconnecting the output unit 502 and the input unit 101 not given the connection permission, in order to send a resulting optical switch connection pattern to the optical switch control circuit 104 as an address of the output unit to be connected to any of the input units.

The optical switch control circuit 104 controls the optical switch 100 in accordance with the connection pattern as set in order to interconnect the input unit 101 and the output unit 502. The result is that a dummy packet is necessarily delivered to the output unit 502 devoid of the packet to be received. If the output unit 502 has detected a special code representing a dummy packet in the dummy packet, it discards the packet. If it has not detected such code, it passes the packet to send same to the receiving station.

In the present example, packets addressed to other output units, that is packets other than the packet addressed to the own output unit and the dummy packet, are not delivered to the output unit 502. Thus, only dummy packets are discarded and normal exchange operations can be carried out without erroneous delivery of packets addressed to other receiving stations or dummy packets.

A 4-by-4 optical switch 100 operates in the same manner as the 4-by-4 optical switch 100 of the first example.

Figure 12:
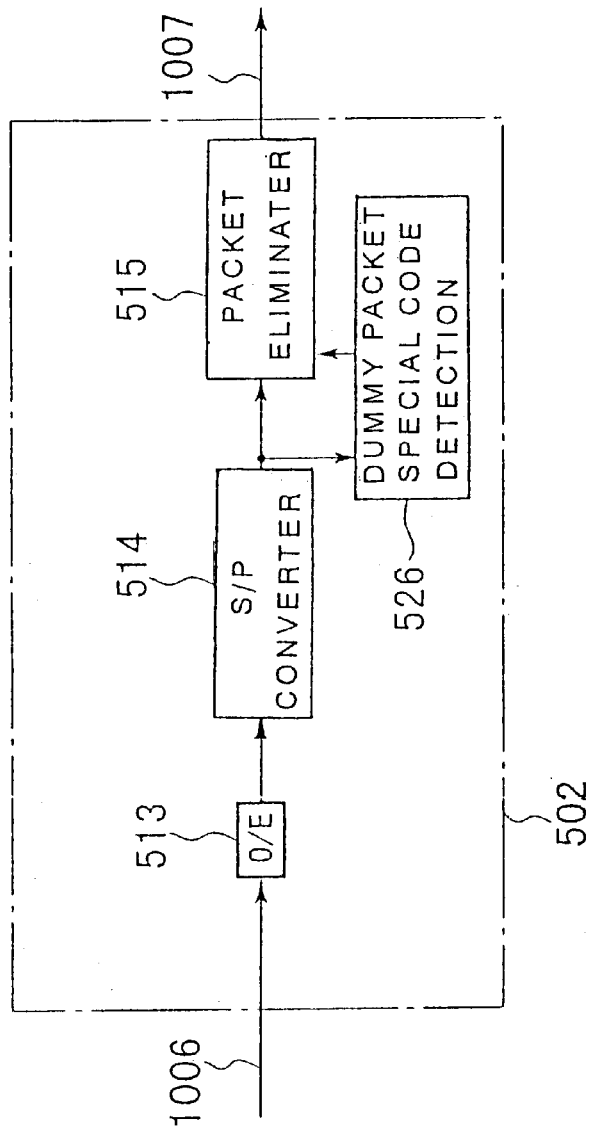
FIG. 12 shows the structure of the output units in Examples 5 to 7.

FIG. 12 shows an illustrative structure of an output unit 502 in the fifth example. Referring to FIG. 12, the output unit 502 includes an optical/electrical converter (O/E) 513, a serial/parallel (S/P) converter 514, a packet eliminating circuit 515 and a dummy packet special code detection circuit 526.

An optical signal 1006, fed from the optical switch 100 (see FIG. 5), is converted by the optical/electrical converter 513 into electrical signals which are converted by the serial/parallel converter 114 so as to be entered to the packet eliminating circuit 115 and to the dummy packet special code detection circuit 526.

On detection of a dummy packet special code specifying a dummy packet, the dummy packet special code detection circuit 526 gives a control signal to the packet eliminating circuit 115 to discard the packet. The result is that an output packet signal is devoid of a packet (NO PACKET). If no dummy packet special code is detected, a packet signal received at the output packet signal 1007 is output.

Figure 13:
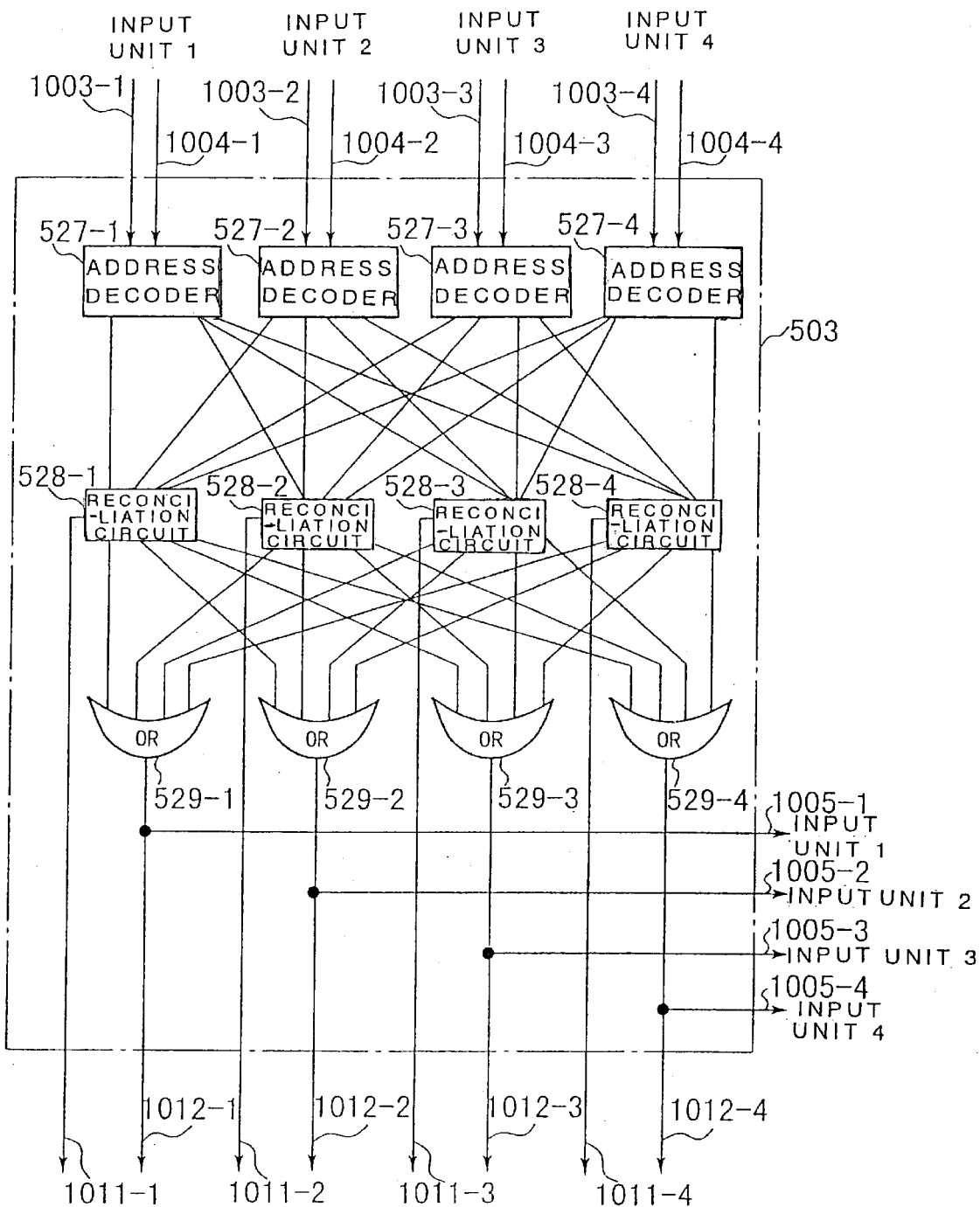
FIG. 13 shows the structure of the contention resolution circuit in Example 5.

FIG. 13 shows an illustrative structure of the contention resolution circuit 503 in the fifth example. Referring to FIG. 13, the contention resolution circuit 503 is made up of address decoders 527-1–4, reconciliation circuits 528-1 to -4 and OR gates 529-1 to -4.

On reception of a destination address signal 1003 and a connection request signal 1004 from any of the input units, the address decoder 527 decodes the destination address to send a connection request signal to the reconciliation circuit 528 associated with the destination.

The reconciliation circuit 528 receives the connection request signal to the output unit associated with the reconciliation circuit from any of the input units to determine to which of the input units required for connection the connection permission should be accorded, to output the connection permission signal to the OR gate 529 while also outputting an output unit void/full signal 1011.

The OR gate 18 ORs the connection permission signals associated with the respective input units of the reconciliation circuits to accord a connection permission signal 1005 to the respective input units. If there is no connection request signal whatsoever in the reconciliation circuit 528, that is if there is no packet to be received by an output unit associated with the reconciliation circuit, the reconciliation circuit 528 outputs no output unit void/full signal 1011.

Figure 14:
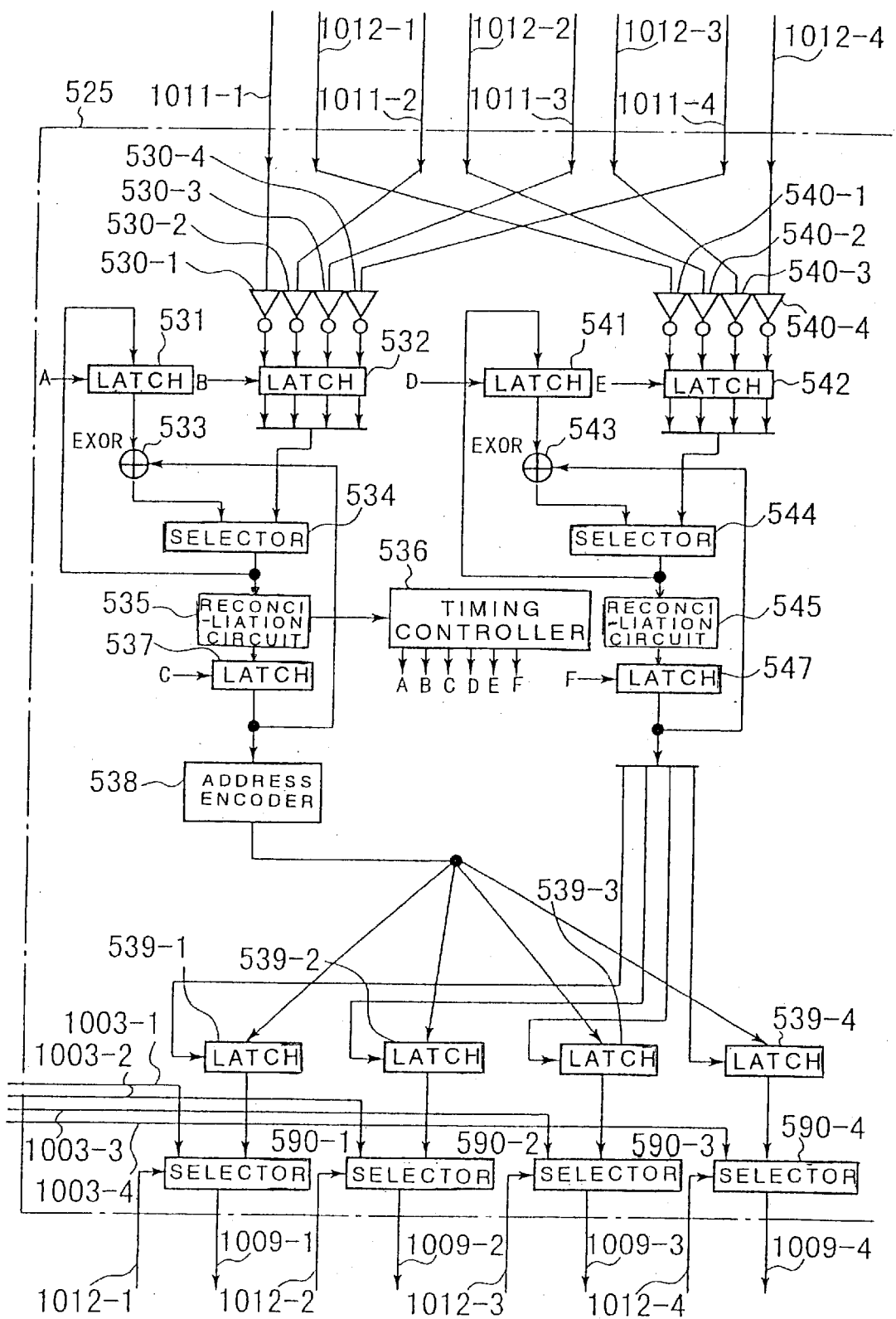
FIG. 14 shows the structure of a dummy packet destination address calculating circuit in Example 5.

FIG. 14 shows an illustrative structure of the dummy packet destination address calculating circuit 525 in the fifth example. Referring to FIG. 14, the dummy packet destination address calculating circuit 525 includes an inverter gate 530, a latch 531, a latch 532, an EXOR gate 533, a selector 534, a reconciliation circuit 535, a timing control circuit 536, a latch 537, an address encoder 538, a latch 539, an inverter gate 540, a latch 541, a latch 542, an EXOR (exclusive OR) gate 543, a selector 544, a reconciliation circuit 545, a latch 547 and a selector 590.

When the dummy packet destination address calculating circuit 525 receives an output unit void/full signal 101 and a connection permission signal 1012 from the contention resolution circuit 503, these signals are converted by the inverter gates 530, 540 into the information of the output unit in the vacant state and the information of the input unit for which no connection permission has been obtained. These two items of the information are temporarily stored in the latches 532 and 542, respectively.

In the first step of address calculations, the selectors 534, 544 select the latches 532, 542, respectively, to output signals of the latches 532, 542 to the reconciliation circuits 535, 545 and the latches 531, 541, respectively. The latches 531, 541 temporarily store the information. In the second and following steps, the selectors 534, 544 select the latches 531, 541. The reconciliation circuits 535, 545 select an output unit and an input unit from plural output units in the vacant state and plural input units for which no connection permission has not been obtained. The selected results are temporarily stored in the latches 537, 547.

The selected sole vacant state output unit information, stored in the latch 537, is encoded by the address encoder 538 into an address of an associated output unit so as to be temporarily stored in the latch 539 associated with the selected input unit stored in the latch 547 and for which no connection permission has been obtained. The information items of the selected output and input units, stored in the latches 537 and 547, are EX-ORed by the EX-OR gates 533 and 543 with the information items of the latches 531 and 541 so that the information items of the selected output and input units are erased while only the information items of the non-selected output and input units remain.

This is again entered to the reconciliation circuits 535, 545 and latches 531, 541 to select each one of the output and input units not selected at the previous step to form a set of an output unit in the vacant state and an input unit devoid of connection permission. This step is repeated. Ultimately, when all the output units in the vacant state have been selected, the reconciliation circuit commands the timing control circuit to halt the calculation loop.

In the absence of the connection permission signal 1012, the selector 590 of the last stage outputs an address of an output unit in the vacant state which has formed a set with an input unit stored in the latch 539 and which is devoid of connection permission, as an optical switch control signal 1009. In the presence of the connection permission signal 1012, a destination address signal 1003 is output as an optical switch control signal 1009.

EXAMPLE 6

Figure 15:
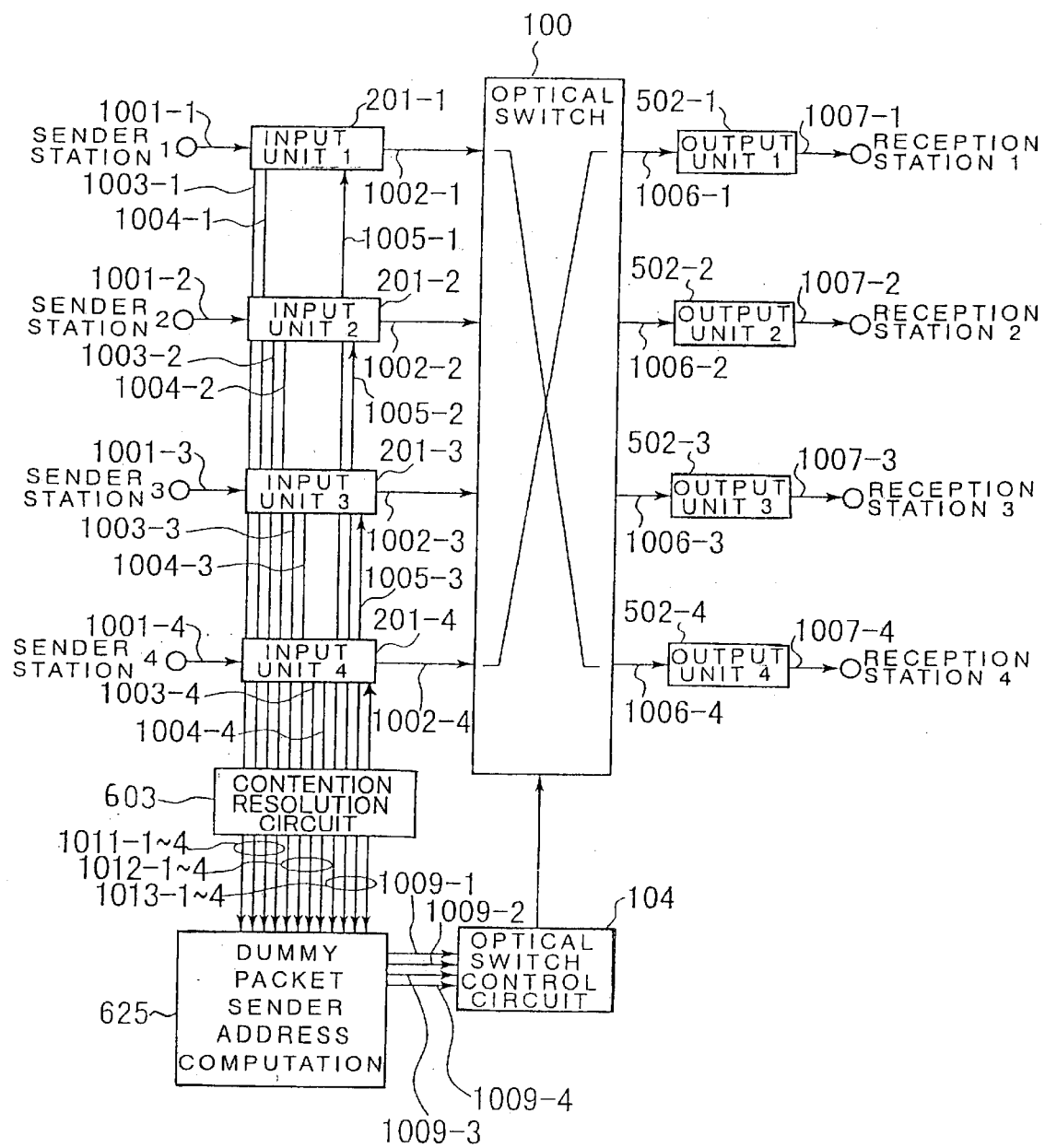
FIG. 15 shows the structure of Example 6.
Figure 16:
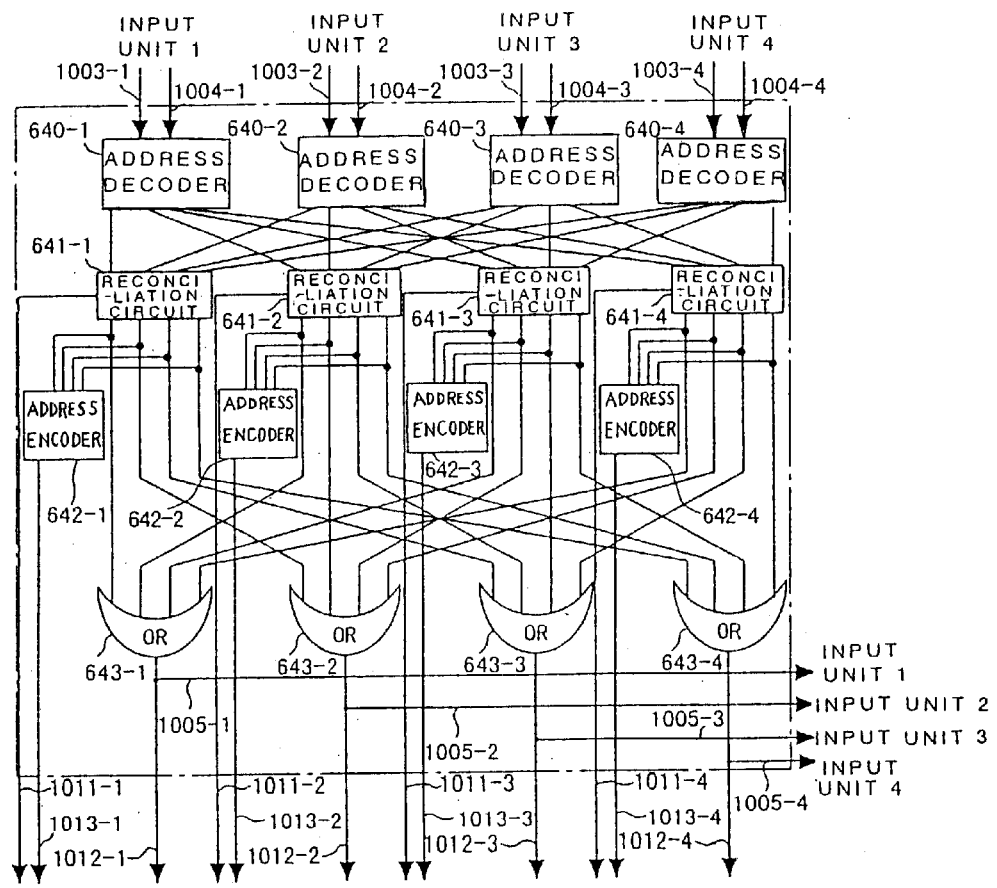
FIG. 16 shows the structure of the contention resolution circuit in Example 6.
Figure 17:
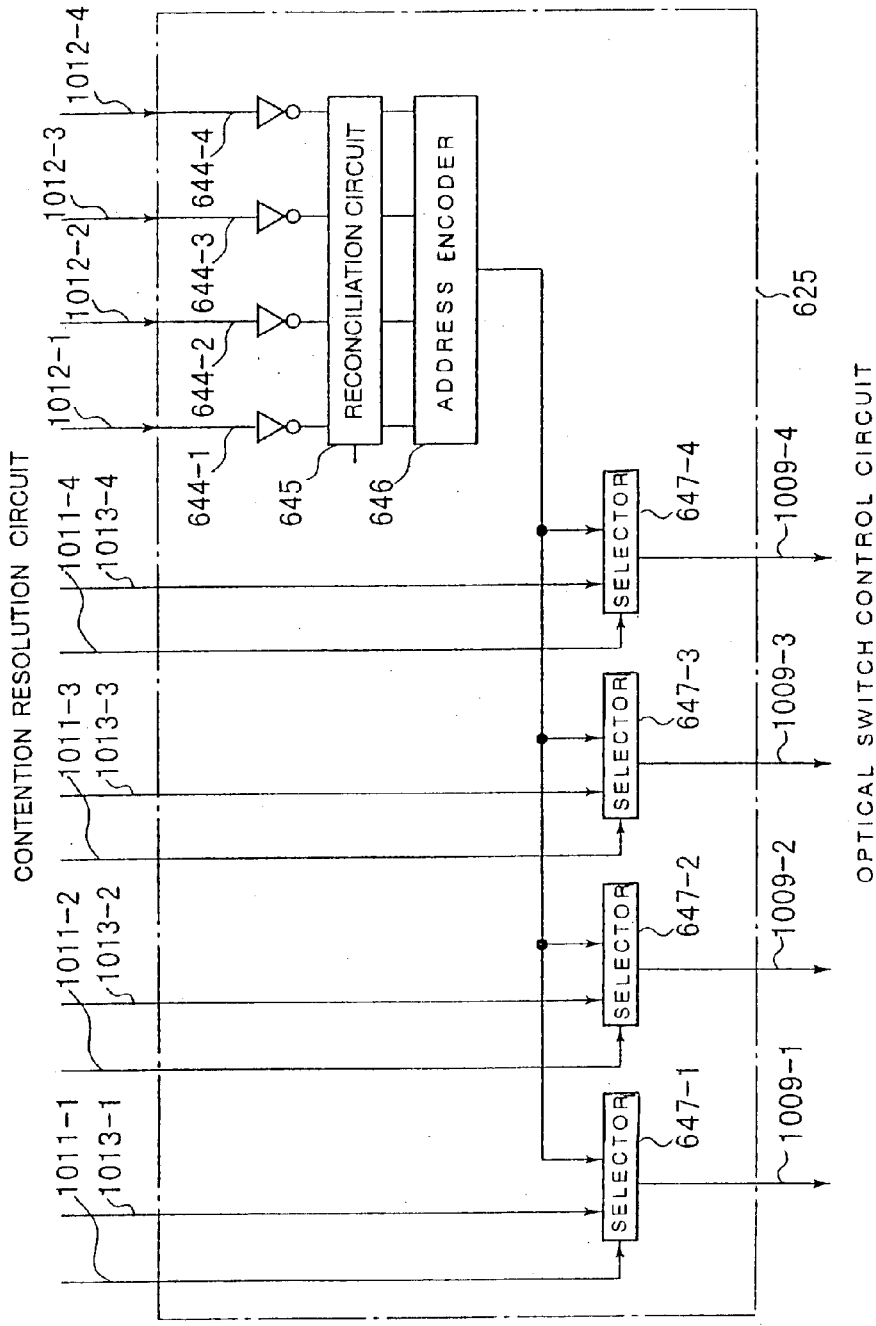
FIG. 17 shows the structure of a dummy packet sender address calculating circuit in Example 6.

Referring to FIGS. 15, 16 and 17, a sixth example is explained. FIG. 15 shows the structure of the sixth example. The present example is directed to an optical packet exchange apparatus of four transmission side channels and four reception side channels representing application of the fifteenth aspect to the fourteenth aspect of the present invention. Referring to FIG. 15, the packet exchange apparatus is made up of four input units 101, an optical switch 100, four output units 502, one contention resolution circuit 603, a dummy packet sender address calculating circuit 625 and an optical switch control circuit 104.

First, the operation of the packet exchange apparatus of the sixth example in its entirety is explained with reference to FIG. 15.

Referring to FIG. 15, a transmission packet sent from a sending station is buffered at an input unit 101. The input unit 101 sends a destination address 1003 of the transmission packet and a connection request signal 1004 to a contention resolution circuit 603, which then receives destination addresses 1003-1 to -4 and the connection request signals 1004-1 to -4 from the input units 101-1 to 4 from the respective input units 101-1 to 4 to judge contention in the output units 102-1 to -4 to send a connection permission signal 1005-1 to -4 to any of the input units that won the contention. The connection permission signals 1005 are however not sent by the contention resolution circuit 603 to the input units which lost the contention or which send no connection request signal.

The input unit 101 which received the connection request signal outputs a transmission packet to the optical switch 100. The input unit 101 who failed to receive the connection permission signals 1005 outputs a dummy packet to the optical switch 100 while it buffers the transmission packet.

The contention resolution circuit 603 sends to the dummy packet sender address calculating circuit 625 an output unit void/full signal 1011 specifying the possible presence of connection requests at the respective output units, connection permission signals 1012 to the respective input units and the addresses 1013 of the input units selected as the result of contention resolution.

The dummy packet sender address calculating circuit 625 selects one of the input units 101 not supplied with the connection permission signal 1012 and sends a control signal 1009 to the optical switch control circuit 104 for connecting the output unit 502 whose output unit void/full signal 1011 specifies the vacant state to the selected input unit.

For the output unit 502 to which connection request is given, an address of an input unit, supplied with the connection permission at the contention resolution circuit 603, is sent to the optical switch control circuit 104. If the input unit 101 is not supplied with the connection permission signal 1005, the input unit 201 sends a dummy packet to the optical switch 100. Thus, under the above-described control of the optical switch, the output unit having no packet for reception is connected to the input unit 101 supplied with a dummy packet, so that the output unit 502 receives the dummy packet. If the output unit 502 detects in a dummy packet the special code representing the dummy packet, it discards the packet. If the output unit 502 fails to detect the special code, it allows the packet to pass through the output unit 502 to send the packet to the reception station.

In the present example, no packets other than the packet addressed to the output unit 502 concerned itself and dummy packets are not sent to the output unit 502. Therefore, only the dummy packets are discarded, while no packets addressed to other reception stations nor dummy packets are erroneously sent to the reception stations, so that a regular exchange operation can be performed.

In the above example, dummy packets are necessarily fed to the input units 101 for which no connection permission signal 1005 has been obtained. Alternatively, it is also possible to send dummy packets only to any of the input units connected to the output unit 502 by sending a dummy packet transmission signal to the input unit selected by the dummy packet sender address calculating circuit 625 without sending the dummy packet transmission signal to other input units.

The 4-by-4 optical switch operates in exactly the same manner as the 4-by-4 optical switch of the first example.

FIG. 16 shows an illustrative structure of the contention resolution circuit 603 in the present example. Referring to FIG. 16, the contention resolution circuit 603 includes address decoders 640-1 to -4, reconciliation circuits 641-1 to -4, address encoders 642-1 to -4 and OR gates 643-1 to -4. On reception of the destination address signals 1003 and the connection request signal 1004 from the respective input units, the address decoder 640 decodes the destination addresses to send connection request signals to the reconciliation circuit 641 associated with the decoded address.

The reconciliation circuit 641 receives from the input units a connection request signal addressed to the output units associated with the reconciliation circuit 641 to decide to which of the input units which made the connection requests the connection permission is to be accorded. The reconciliation circuit 641 then outputs a connection permission signal to the address encoder 642 and to the OR gate 643 to output the connection permission signals to the address encoder 642 and to the OR gate 643, while outputting an output unit void/full signal 1011 to the dummy packet sender address calculating circuit 625.

The address encoder 642 encodes the connection permission signal received from the reconciliation circuit 641 in the address of the input unit for which the connection permission has been accorded to send the resulting signal to the dummy packet sender address calculating circuit 625.

The OR gate 643 takes a logical sum of the connection permission signals associated with the respective input units of the reconciliation circuits to accord the connection permission signals 1005 to the respective input units.

In the absence of the connection request signal in the reconciliation circuit 641, that is in the absence of the packet to be received by the output unit associated with the reconciliation circuit, no output unit void/full signal 1011 is output by the reconciliation circuit 641.

FIG. 17 shows an illustrative structure of the dummy packet sender address calculating circuit 625 of the present example.

Referring to FIG. 17, the dummy packet sender address calculating circuit 625 includes an inverter gate 644, a reconciliation circuit 645, an address encoder 646 and a selector 647.

The dummy packet sender address calculating circuit 625 receives the output unit void/full signal 1011, a connection permission signal 1012 and an address 1013 of the input unit selected on contention judgment from the contention resolution circuit 603 (see FIG. 15).

The inverter gate 644 converts the connection permission signal 1012 into the information on the input unit for which no connection permission has been obtained. The reconciliation circuit 645 selects one of the input units devoid of the connection permission as an input unit to which should be connected an output unit in the vacant state. The information of the selected input unit is converted by the address encoder 646 into an address.

If the output unit void/full signal 1011 indicates a vacant state, the selector 647 selects the address of the input unit generating the dummy packet selected as described above. On the other hand, if the output unit void/full signal 1011 does not indicate the vacant state, the selector 647 selects the address of the input unit selected by the contention resolution circuit 603 to output the selected address as a control signal 1009 to the optical switch control circuit 104.

EXAMPLE 7

Figure 18:
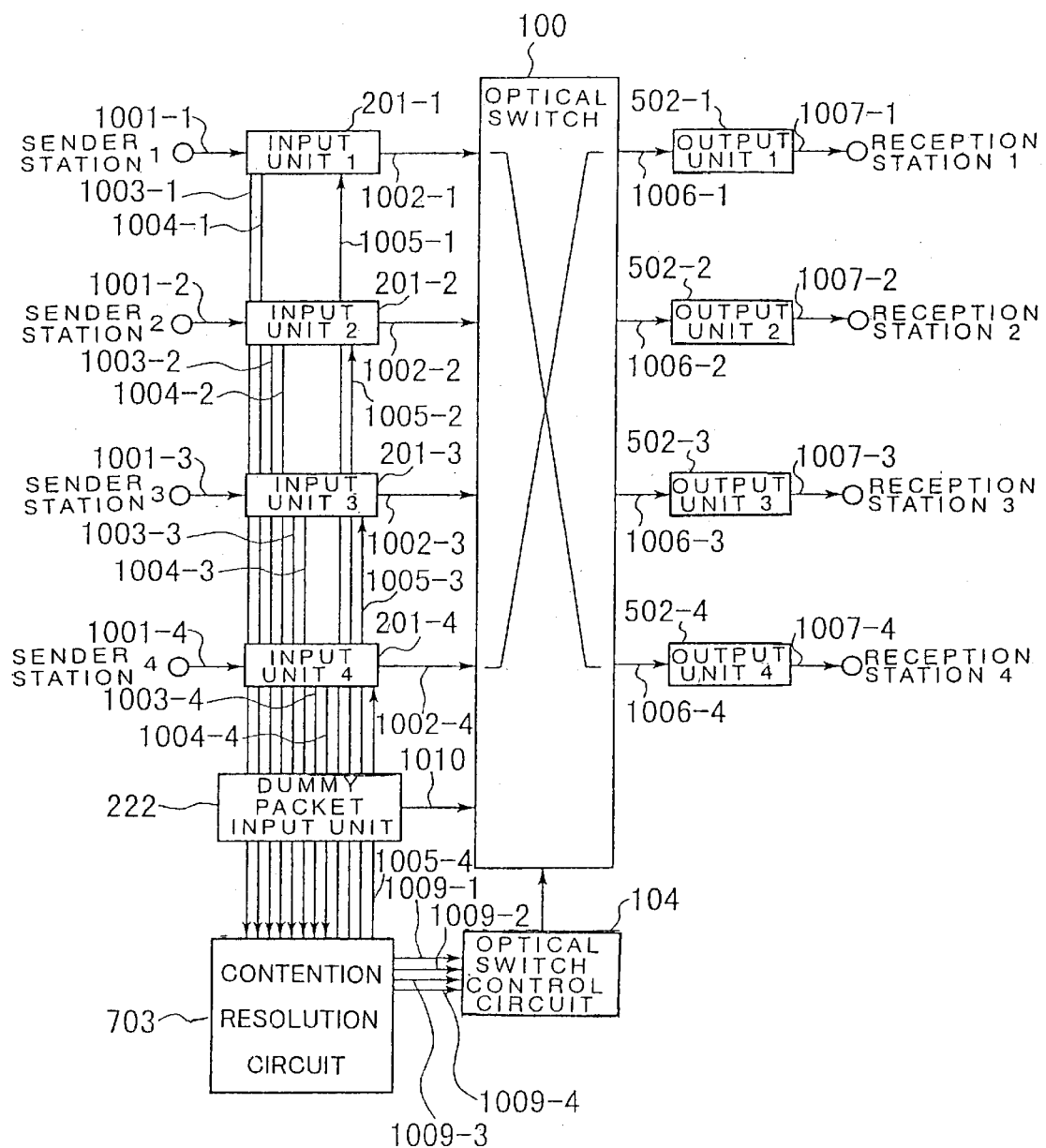
FIG. 18 shows the structure of Example 7.
Figure 19:
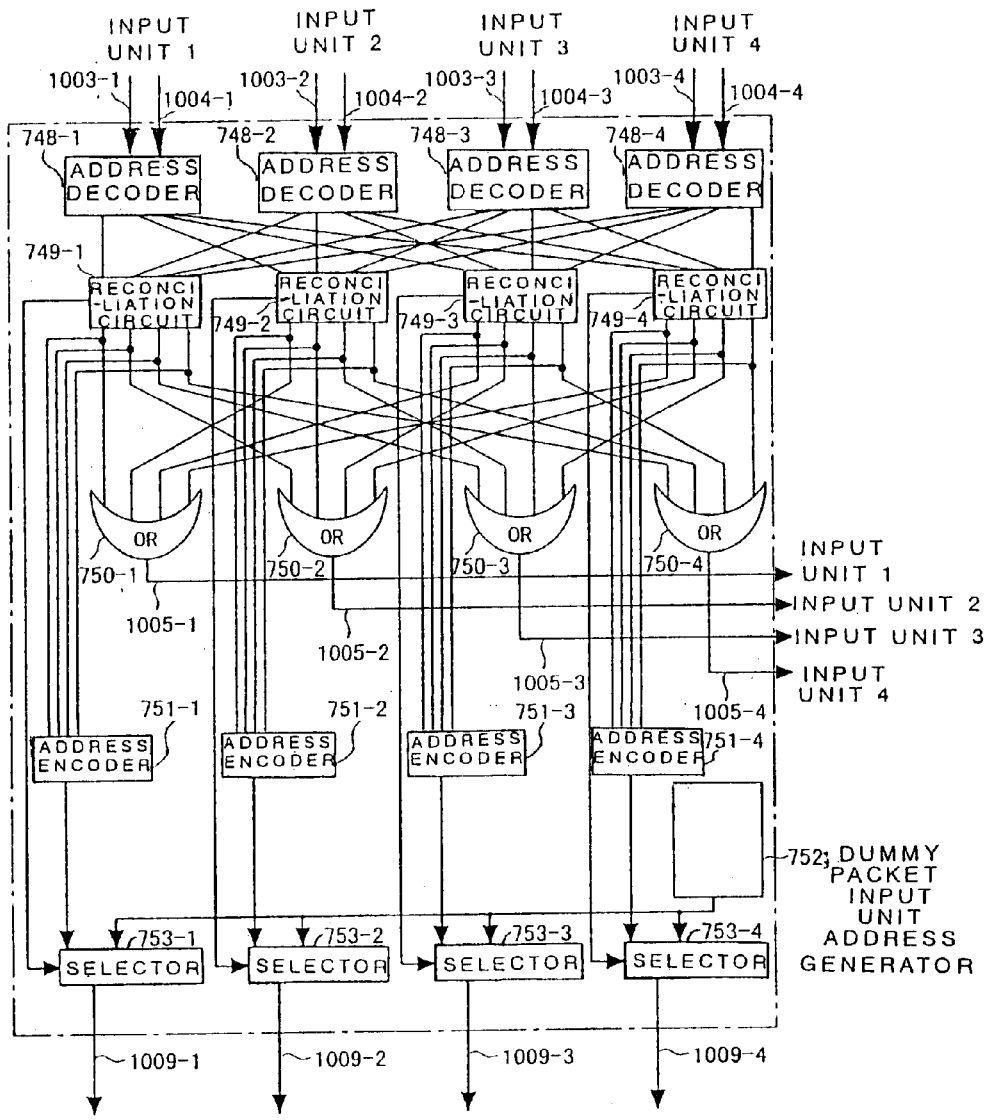
FIG. 19 shows the structure of the contention resolution circuit in Example 7.

Referring to FIGS. 18 and 19, Example 7 is explained. FIG. 18 shows the structure of the Example 7. The present example is directed to a optical packet exchange apparatus for four transmission channels and four reception channels practicing the seventeenth aspect of the present invention. Referring to FIG. 18, the optical packet exchange apparatus includes four input units 201, an optical switch 100, four output units 502, a contention resolution circuit 703, an optical switch control circuit 104 and a dummy packet input unit 222.

Referring to FIG. 18, the operation of the optical packet exchange apparatus of the seventh embodiment in its entirety is explained.

Referring to FIG. 18, the transmission packet sent from a sending station is buffered at an input unit 201. The input unit 201 sends a destination addresses 1003 of the transmission packet and a connection request signal 1004 to the contention resolution circuit 703. The contention resolution circuit 703 receives the destination addresses 1003-1 to -4 and the connection request signals 1004-1 to -4 from the respective input units 201-1 to -4 to judge contention among the output units 502-1 to -4 to send a connection permission signal 1005-1 to -4 to any of the input units which won the contention. The contention resolution circuit 703 sends no connection permission signal 1005 to an input unit which lost the contention or failed to send the connection request signal.

The input unit 201 receiving the connection permission signal 1005 outputs the transmission packet to the optical switch 100. The input unit 201 who failed to receive the connection permission signal 1005 keeps the transmission packet buffered. The contention resolution circuit 703 sets a connection pattern for the optical switch 100 from the results of judgment of contention to send an optical switch control signal 1009 to the optical switch control circuit 104, while setting a connection pattern for connecting the output unit 502 not required for connection to the dummy packet input unit 222. The output unit 502 not required for connection is connected to the dummy packet input unit 222 to receive the dummy packet. If the output unit 502 has detected the special code representing the dummy packet in the dummy packet, it discards the packet and, if the output unit 502 has failed to detect the code, it allows the packet to pass therethrough to send the packet to the reception station.

In the present example, since no packet addressed to output units other than the own output unit and other than the dummy packet is sent to the output unit 502, only the dummy packet is discarded, such that the exchange operation proceeds smoothly, without the packet addressed to other reception stations or dummy packets being erroneously sent to the receiving station.

The 4-by-4 optical switch 100 operates in exactly the same manner as the 4-by-4 optical switch 100 of Example 1.

FIG. 19 shows an illustrative structure of a contention resolution circuit 703 of the present example. Referring to FIG. 19, the contention resolution circuit 703 includes address decoders 748-1 to -4, conciliation circuits 749-1 to -4, OR gates 750-1 to -4, address encoders 751-1 to -4, a dummy packet input unit address generator 752 and selectors 753-1 to -4.

On reception of the destination address signal 1003 and the connection request signal 1004 from the input units, the address decoder 748 decodes the destination addresses to send the decoded address to the associated reconciliation circuit 749.

The reconciliation circuit 749 receives the connection request signal to the output unit associated with the reconciliation circuit to decide to which of the input units who made connection requests the connection permission is to be accorded, and outputs the connection permission signal to the OR gate 750 and to the address encoder 751.

The OR gate 750 takes a logical sum of the connection permission signals associated with the respective input units of the reconciliation circuits to accord the connection permission signals 1005 to the input units. The address encoder 751 encodes the connection permission signal from the sole reconciliation circuit 749 into an address to acquire an address of the input unit to which should be connected each output unit. The resultant address is output as an optical switch control signal 1009 via selector 753 to the optical switch control circuit.

In the complete absence of the connection request signals in the reconciliation circuit 749, that is in the absence of a packet to be received by an output unit associated with the reconciliation circuit, the reconciliation circuit 749 controls the selectors 753 by the selector control signal to output an address generated by the dummy packet input unit address generator 752 as an optical switch control signal 1009 to the optical switch control circuit.

EXAMPLE 8

Figure 20:
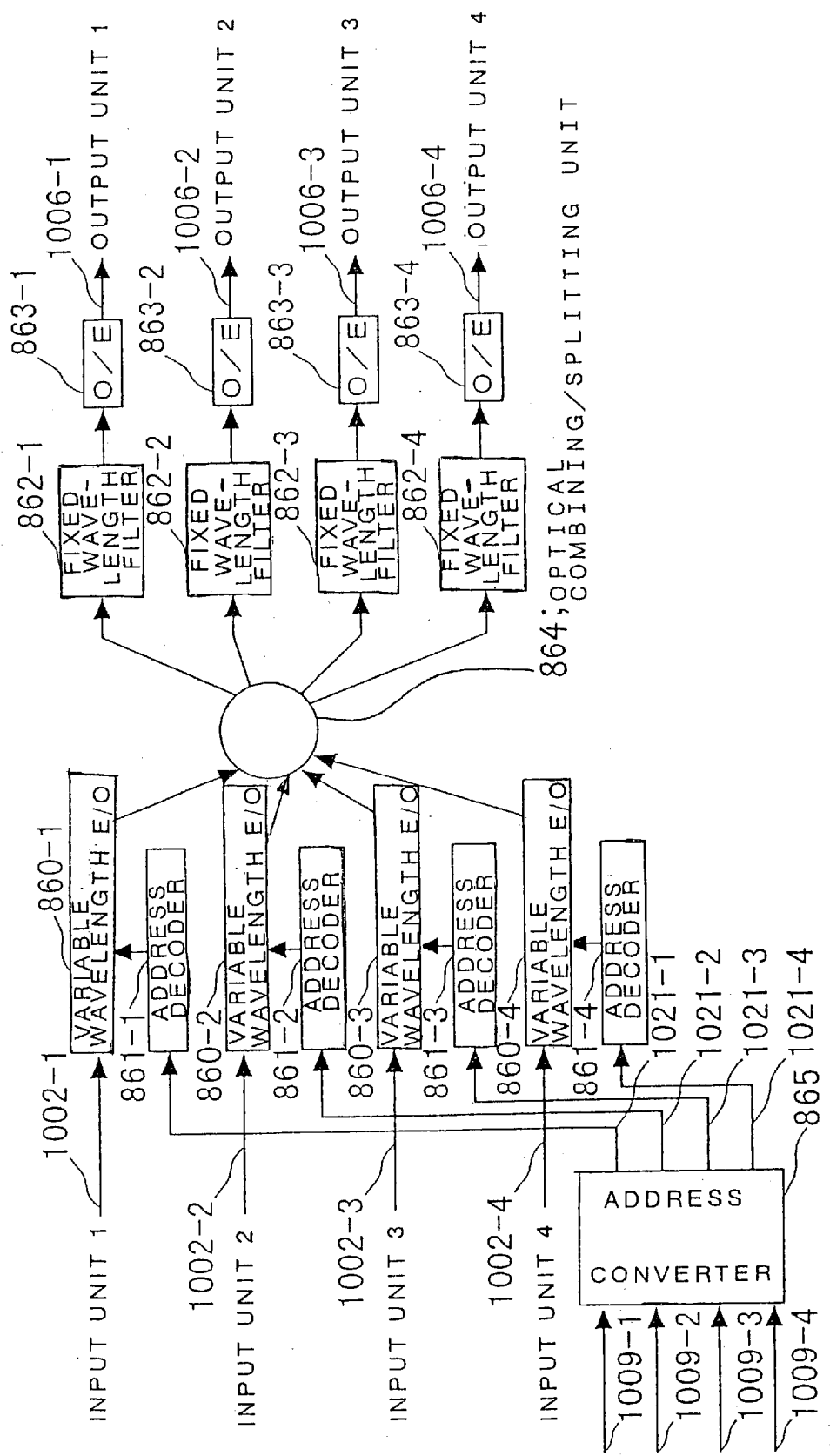
FIG. 20 shows the structure of Example 8.
Figure 26:
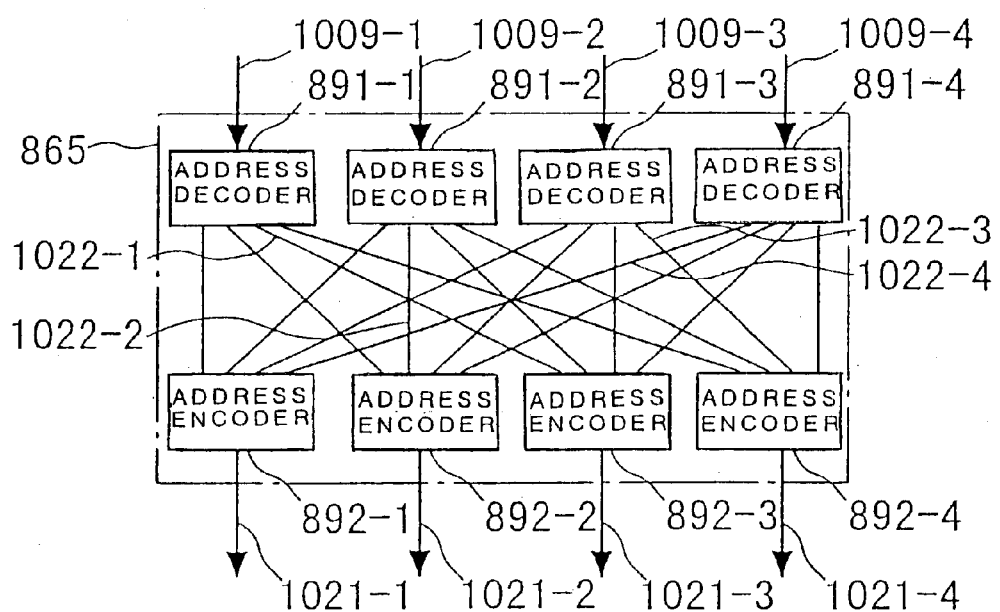
FIG. 26 illustrates the structure of address conversion circuits in Examples 8 to 11.
Figure 27:
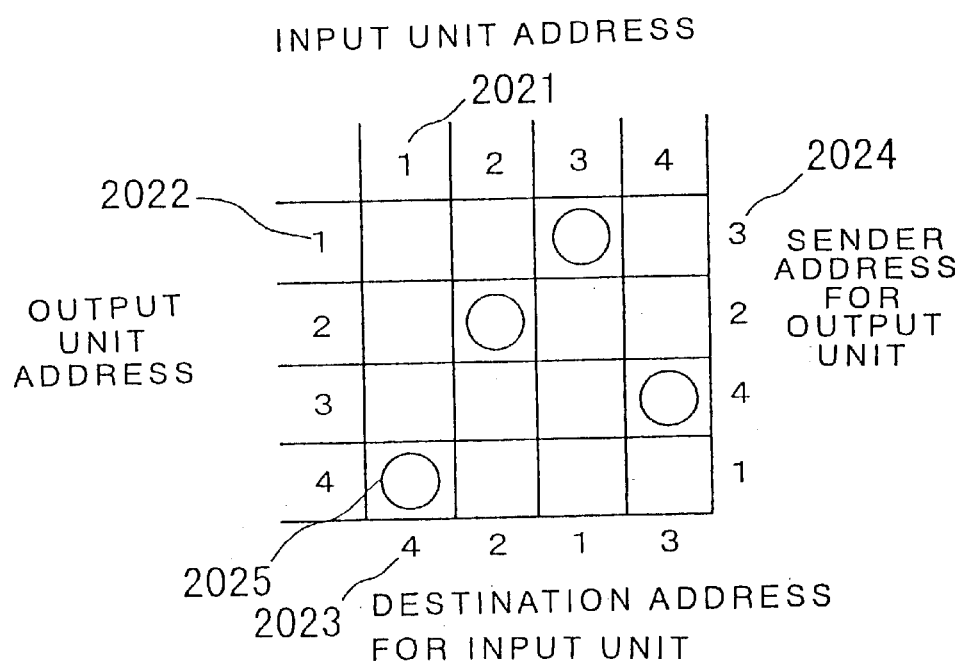
FIG. 27 illustrates the operation of address conversion circuits in Examples 8 to 11.

Referring to FIGS. 20, 26 and 27, an Example 8 is hereinafter explained. FIG. 20 shows an illustrative structure of the example 8. The present example illustrates the structure of an optical switch for four transmission channels and four reception channels practicing the eighteenth aspect of the present invention.

Referring to FIG. 20, an optical switch of the present example includes four variable wavelength electrical/optical converters (E/O) 860, four address decoders 861, four fixed wavelength filters 862, four optical/electrical converters 863, a light combining/splitting unit 864 and an address conversion circuit 865.

The fixed wavelength filters 862-1 to -4 are optical filters $\lambda 1, \lambda 2, \lambda 3$ and $\lambda 4$ fixedly allocated to the filters 862-1 to -4. The variable wavelength electrical/optical converters 860 are electrical/optical converters combined from the variable wavelength semiconductor laser and an electrical field absorbing type semiconductor light modulator and operates responsive to a control signal to convert the input electrical signals to an optical signal of an optional wavelength selected from $\lambda 1, \lambda 2, \lambda 3$ and $\lambda 4$. The transmission light wavelength of the variable wavelength electrical/optical converter 860 is controlled by the address information decoded by the address decoder 861. If, for example, the address is 1, the variable wavelength electrical/optical converters 860 sets the transmission light wavelength to $\lambda 1$ which is equal to the transmission wavelength $\lambda 1$ of the fixed wavelength filter connected to the output unit 1 to send the optical signal. That is, the address decoder 861 decodes the address of the output unit which is to be the address in the input unit in order to control the variable wavelength electrical/optical converters 860.

The optical signals sent from all of the variable wavelength electrical/optical converters 860 are combined (synthesized) by the light combining/splitting unit 864 and split to all fixed wavelength filters 862. In this case, if the plural variable wavelength electrical/optical converters 860 simultaneously send optical signals at the same transmission wavelength, the light signals cannot be split from the combined optical signals by the light combining/splitting unit 864. Therefore, the variable wavelength electrical/optical converters 860 need to be set to respective different wavelengths. Thus, the contention resolution circuit perform contention judgment so that the optical signals are of mutually different wavelengths. The resulting connection patterns are encoded (or not encoded) and sent in this state to the optical switch control circuit to control the optical switch as an optical switch control signal.

There are three methods of sending the connection pattern (mode), that is (1) a method of sending the connection pattern as a bit map without encoding, (2) a method of encoding the connection pattern and sending the encoded connection pattern as a sender address to an output unit and (3) a method encoding the connection pattern to send the encoded connection pattern as a destination address for the input unit. However, since the method of sending the connection pattern without encoding leads to an increased number of control lines with increase in the number of switch boards, it is preferred to encode the connection pattern into addresses.

On the other hand, with the optical switch, described above, the control signal accorded to the address decoder 861 needs to be a destination address for the input unit. On the other hand, there are occasions wherein the optical switch control signal accorded by the contention resolution circuit represents a sender address for the output unit. In such case, the sender address for the output unit accorded from the contention resolution circuit using the address conversion circuit 865 is converted into a destination address for the input unit, which address is accorded to the address decoder 861.

FIG. 26 shows an illustrative structure of a four-channel address conversion circuit made up of four address decoders 891 and four address encoders 892.

FIG. 27 illustrates the operation of the 4-channel address conversion circuit 865 (see FIG. 20). Since the address conversion circuit 865 is a circuit used in common by the circuit for converting the sender address for the output unit into a destination address for the input unit and by a circuit for converting the destination address for the input unit into the sender address for the output unit, the operation of converting the sender address for the output unit into a destination address for the input unit is explained as an example.

FIG. 27 shows an example of a connection pattern (mode) interconnecting the input and output units, that is, it shows that input and output units represented by an input unit address 2021 and an output unit address 2022 are interconnected by a connection pattern represented by a bit map pattern 2025. That is, the third input unit and the first output unit are connected together, while the second input unit and the second output unit are connected together. Similarly, the fourth input unit and the third output unit are connected together, while the first input unit and the fourth output unit are connected together. The sender addresses for the output units are 3, 2, 4 and 1 for the first, second, third and fourth output units, respectively. If these are entered to the address conversion circuit 865, the address 3 for the output unit 1 is entered at an input line 1009-1.

The address decoder 891-1 decodes the address entered from the input line 1009-1 to output a signal at a signal line 1022-1 associated with (corresponding to) the address 3. The address encoders 892-3 connected to the signal line 1022-1 encodes the address 1 associated with the connection position of the signal line 1022-1 to output the address 1 at the output line 1021-3. Since the output line 1021-3 is associated with the third input unit, the address 1 for the third input unit, that is the destination address for the input unit, is output. Similar conversion is carried out for the remaining input lines 1009-2 to -4. Conversion from the destination addresses for the input unit to the sender address to the output unit occurs in exactly the same manner.

EXAMPLE 9

Figure 21:
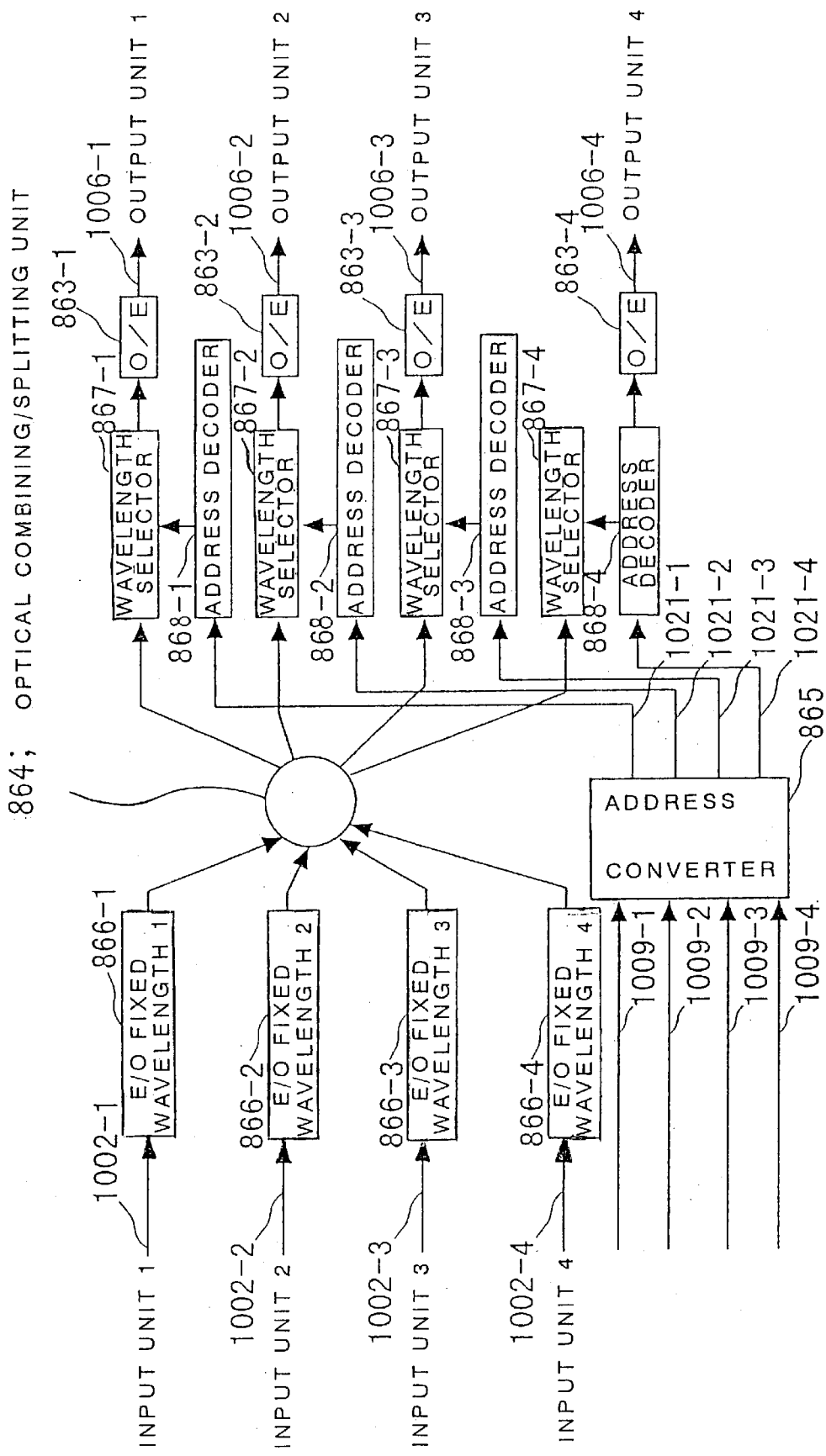
FIG. 21 shows the structure of Example 9.

FIG. 21 shows the structure of an Example 9. The present example is directed to an optical switch for the four transmission side channels and four reception side channels for practicing the nineteenth aspect of the present application. Referring to FIG. 21, an optical switch of the present example includes four fixed wavelength electrical/optical (E/O) converters 866, four address decoders 868, four wavelength selectors 867, four optical/electrical (O/E) converters 863, a light combining/splitting unit 864 and an address conversion circuit 865.

The fixed wavelength electrical/optical converters 866-1 to -4 are electrical/optical converters, combined from electrical field absorbing type modulator and DFB laser units to which transmission light wavelengths of $\lambda 1$, $\lambda 2$, $\lambda 3$ and $\lambda 4$ are allocated fixedly. The wavelength selector 867 is an acousto-optical effect optical filter prepared from lithium niobate crystal and can select the wavelength by an external control signal to output optical signals.

The optical signals sent from all fixed wavelength electrical/optical converters 866 are combined by the light combining/splitting unit 864 and split for all avelength selectors 867.

The wavelength selector 867 is a selective optical filter for selecting an optional one of the plural wavelengths of $\lambda 1$, $\lambda 2$, $\lambda 3$ and $\lambda 4$ to transmit the selected wavelength. The optical/electrical converters 863 receive only the optical signal transmitted through the wavelength selector 867 for conversion to the electrical signal. On the other hand, the transmission light wavelength of the wavelength selector 867 is controlled by the address information decoded by the address decoder 868. For example, if the address is 1, the transmission light wavelength is set to $\lambda 1$ which is the same as the transmission light wavelength $\lambda 1$ of the fixed wavelength electrical/optical converter 866-1 of the input unit 1 so that only the optical signal of the wavelength $\lambda 1$ is transmitted from the received optical signal and converted by the optical/electrical converters 863-1 into an electrical signal which is received. That is, the output unit decodes the address of the input unit as the sender to control the wavelength selector 867.

If plural input units transmit packets to the same output unit, there occurs interference at the optical/electrical converters 863 thus disabling correct data transmission. Therefore, the contention resolution circuit effectuates contention resolution as to which input unit is to transmit in its time slot. The resulting connection pattern controls the optical switch as an optical switch control signal.

With the present optical switch, the control signal accorded to the address decoder 868 needs to be a sender address for an output unit. On the other hand, there are occasions wherein the optical switch control signal accorded from e.g., the contention resolution circuit may be a destination address for an input unit. In such case, the sender address for an input unit accorded by e.g., a contention resolution circuit using the address conversion circuit 865 is converted into a sender address for the output unit, which address is supplied to the address decoder 868.

Figure 22:
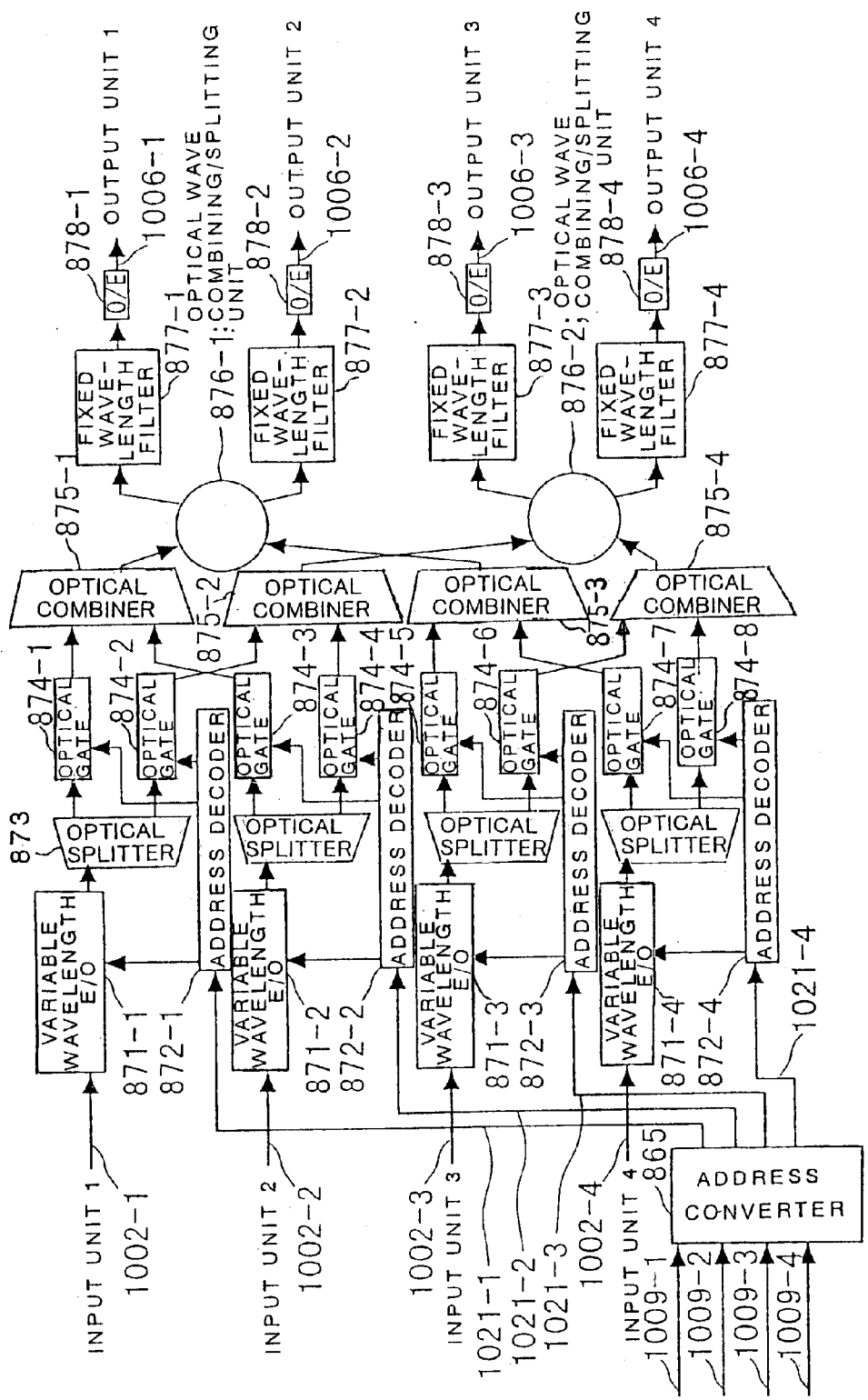
FIG. 22 shows the structure of Example 10.

Referring to FIGS. 22 and 28, a tenth example is explained. FIG. 22 shows the structure of the tenth example. The present example is directed to an optical switch for four transmission side channels and four reception side channels representing application of the twenty-first aspect to the twentieth aspect of the present application. Referring to FIG. 22, the present example includes four variable wavelength electrical/optical (E/O) converters 871, four address decoders 872, four optical splitters 873, eight optical gates 874, four optical combiners 875, two optical combining/splitting units 876, four fixed wavelength filters 877, four optical combining/splitting units 878 and an address conversion circuit 865.

The fixed wavelength filters 877-1 to -4 are optical filters for transmitting the fixedly allocated wavelengths $\lambda 1, \lambda 2, \lambda 3$ and $\lambda 4$. On the other hand, the variable wavelength electrical/optical converters 871 are electrical/optical converters combined from the variable wavelength semiconductor laser and the electrical field absorbing type semiconductor light modulator and are responsive to the control signal to convert the input electrical signals into optical signals of an optional one of the wavelengths λ1 and λ2 to output the resulting signals. The transmission light wavelength of the variable wavelength electrical/optical converters 871 and the opening/closure of the optical gate 874 are controlled by the address information decoded by the address decoder 872.

FIG. 28 illustrates the control operation of the optical gate 874 and the variable wavelength electrical/optical converters 871 by the address decoder 872. The address signal of FIG. 28 is a binary representation of the address signal associated with the number at 2026 of the output unit which is the destination of packet. Higher bits 2027 and lower bits 2028 of the address signal in the binary representation are used for controlling the optical gate 874 and the variable wavelength electrical/optical converters 871, respectively. If the higher bits 2027 are 0, the optical gates 874-1, -3, -5 and -7 are turned on, while the optical gates 874-2, -4, -6 and -8 are turned off. If the higher bits 2027 are 1, the optical gates 874-1, -3, -5 and -7 are turned off, while the optical gates 874-2, -4, -6 and -8 are turned on. On the other hand, if the lower bits 2028 are 0 or 1, the variable wavelength electrical/optical converters 871 set the transmission light wavelength to 1 and to 2, respectively.

Specifically, taking an example of outputting from the input unit 1 a packet having the output unit 3 as an address, an address signal 10 is entered to the address decoder 872-1. Since the lower bit is 0, the transmission light wavelength of the variable wavelength electrical/optical converter 871-1 is set to λ1 to output a packet light signal. The packet light signal is then branched in the optical splitter 873-1 to enter the optical gates 874-1 and -2. Since the higher bit of the address signal is 1, the optical gate 874-1 is turned off, while the optical gate 874-2 is turned on, so that the packet light signal enters the optical combining/splitter unit 876-2 from the optical combining 875-2 and branched to enter the fixed wavelength filters 877-3 and -4. Since the fixed wavelength filter 877-3 transmits the optical signal with the wavelength λ1, while the fixed wavelength filter 877-4 transmits the optical signal with the wavelength λ2, the packet light signal with the transmission light wavelength λ1 is not transmitted through the fixed wavelength filter 877-4 but is transmitted through the fixed wavelength filter 877-3 so that only the optical/electrical converter 878-3 receives the packet light signal to exchange the packet to the output unit 3.

In this manner, the address decoder 872 decodes the address of the output unit of the destination in order to control the variable wavelength electrical/optical converter 871 and the optical gate 874.

If plural input units transmit packets addressed to the same output unit, interference occurs in the optical/electrical converter 878 to disable correct data transfer. Thus, the contention resolution circuit performs contention judgment in order to judge which input unit should transmit in its time slot. The connection pattern thus obtained is sent to the optical switch control circuit to control the optical switch as the optical switch control signal.

In the present optical switch, the control signal accorded to the address decoder 872 needs to be a destination addresses directed to the input unit. On the other hand, there are occasions wherein the optical switch control signal accorded from the contention resolution circuit might be a sender address directed to the output unit. In this case, the sender address directed to the output unit accorded from the contention resolution circuit or the like using the address conversion circuit 865 is converted into a destination address for the input unit which is then accorded to the address decoder 872.

EXAMPLE 10

Figure 23:
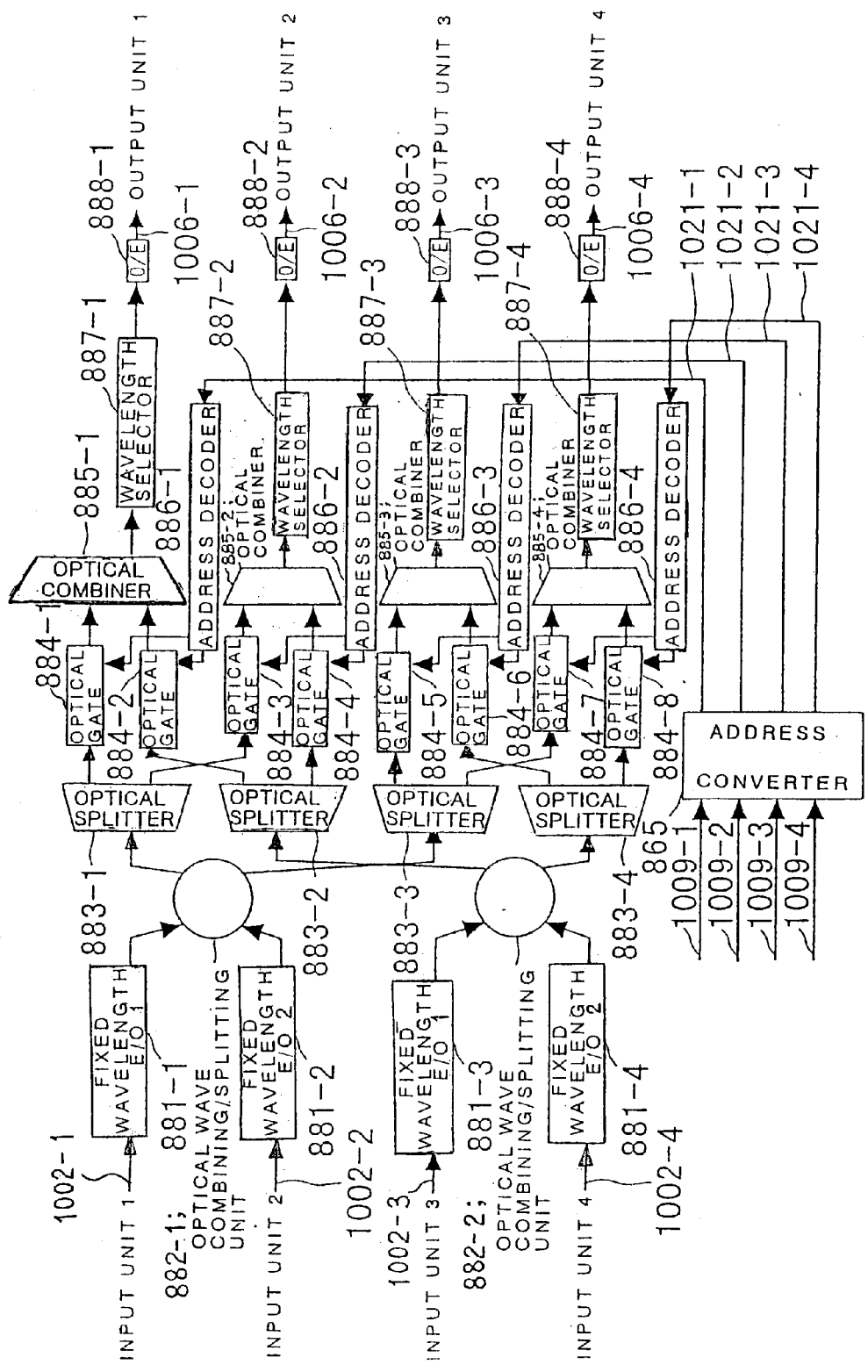
FIG. 23 shows the structure of Example 11.

Referring to FIG. 23, an Example 11 is explained. FIG. 23 shows the structure of the Example 11. The present Example is directed to an optical switch for four transmission side channels and four reception side channels representing an application of the twenty-third aspect to the twenty-second aspect of the invention. Referring to FIG. 23, the present Example includes four fixed wavelength electrical/optical (E/O) converters 881, two optical combining/splitting units 882, four optical splitters 883, eight light gates 884, four optical combiners 885, four address decoders 886, four wavelength selectors 887, four optical/electrical converters 888 and an address converter circuit 865.

The fixed wavelength electrical/optical converters 881-1 to -4 are electrical/optical converters combined from the electrical field absorbing type modulators and DFB laser units to which are fixedly allocated the transmission light wavelengths of λ1, λ2, λ1, λ2, respectively.

The wavelength selector 867 are acousto-optical effect optical filters produced using lithium niobate crystals and can output optical signals by selecting the wavelength by external control signal.

The optical signals transmitted from the fixed wavelength electrical/optical converters 881 of the input units 1 and 2 are combined by the optical combining/splitting units 882 and split to optical splitters 883-1 and -3 and thence sent to the optical gates 884-1, 884-3, 884-5 and 884-7. For example, the address decoder 886-1 controls two optical gates 884-1 and 884-2, one 884-1 of which is turned on to send the signal of the input unit 1 or 2 through the optical combiner 885-1 to the wavelength selector 887-1 which then selects the transmission light wavelength λ1 or λ2 to select and transmit the optical signal of the input unit 1 or the optical signal of the input unit 2 for reception by the optical/electrical converter 888-1.

In this manner, the control signal of the address decoder 886-1 turns the optical gate 884-1 on in order to set the connection to the input unit to be connected to the output unit 1. This selects the input units 1 and 2 of the input units 1 to 4. On the other hand, the selected transmission light wavelength of the wavelength selector 887-1 is controlled to λ1 to select the input unit 1. That is, the address decoder 886-1 acquires the transmitter (sender) address for the output unit 1 to decode the address to control the optical gate and the wavelength selector, and hence the optical switch.

If plural input units transmit packets to the same output unit, there occurs interference at the optical/electrical converters 878 to disable correct data transfer. Thus, the contention resolution circuit judges contention as to which input unit transmits the packet in its time slot. The connection pattern obtained in this manner is sent to the optical switch control circuit to control the optical switch as an optical switch control signal.

With the present optical switch, the control signal accorded to the address decoder 868 needs to be a destination address for an input unit. On the other hand, there are occasions wherein the optical switch control signal is the sender address for the output unit. In this case, the sender address for an output unit accorded by e.g., a contention resolution circuit etc. using the address conversion circuit 865 is converted into a destination address for the input unit, which address is accorded to the address decoder 886.

Figure 29:
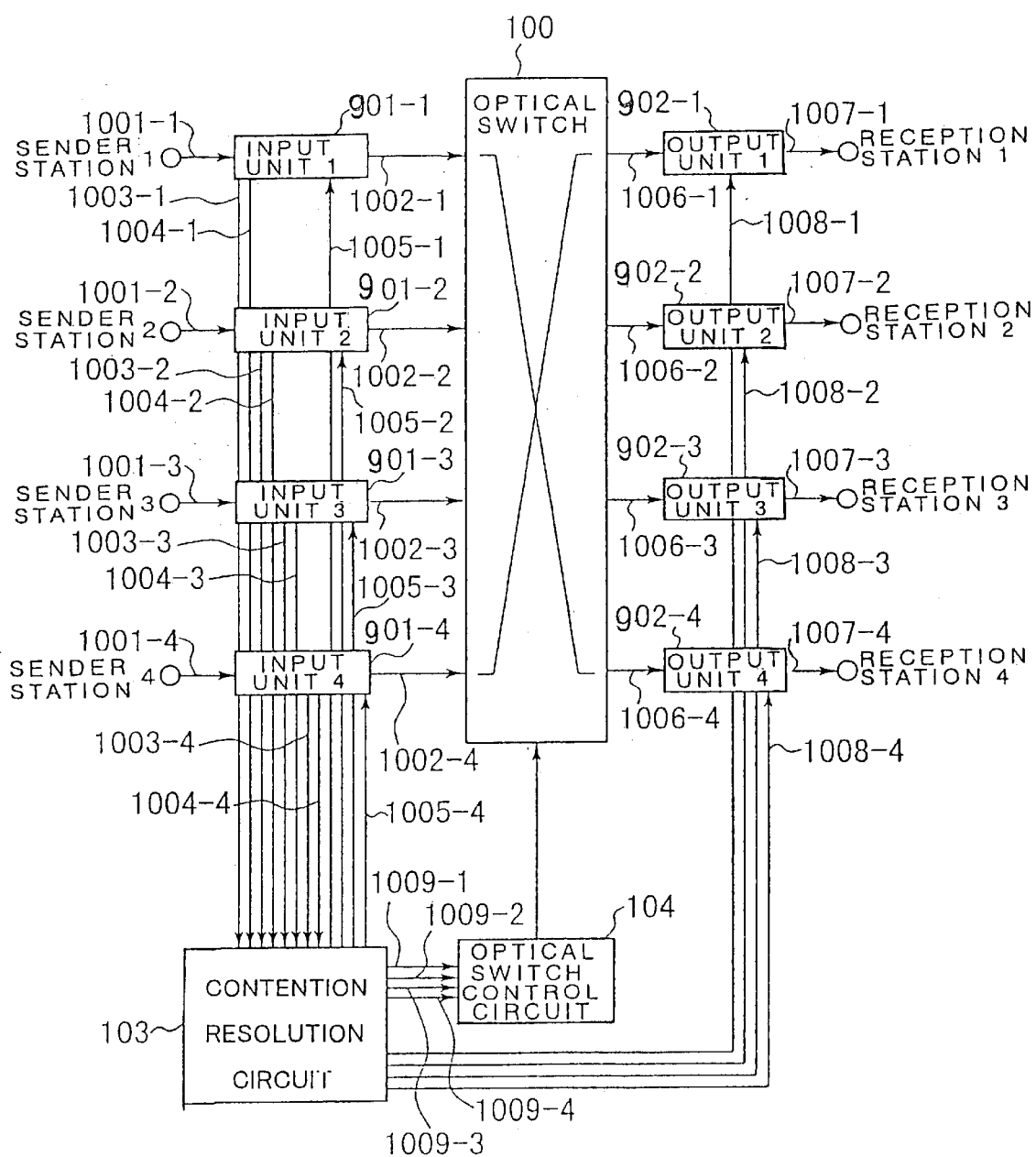
FIG. 29 illustrates the structure of Example 12.
Figure 30:
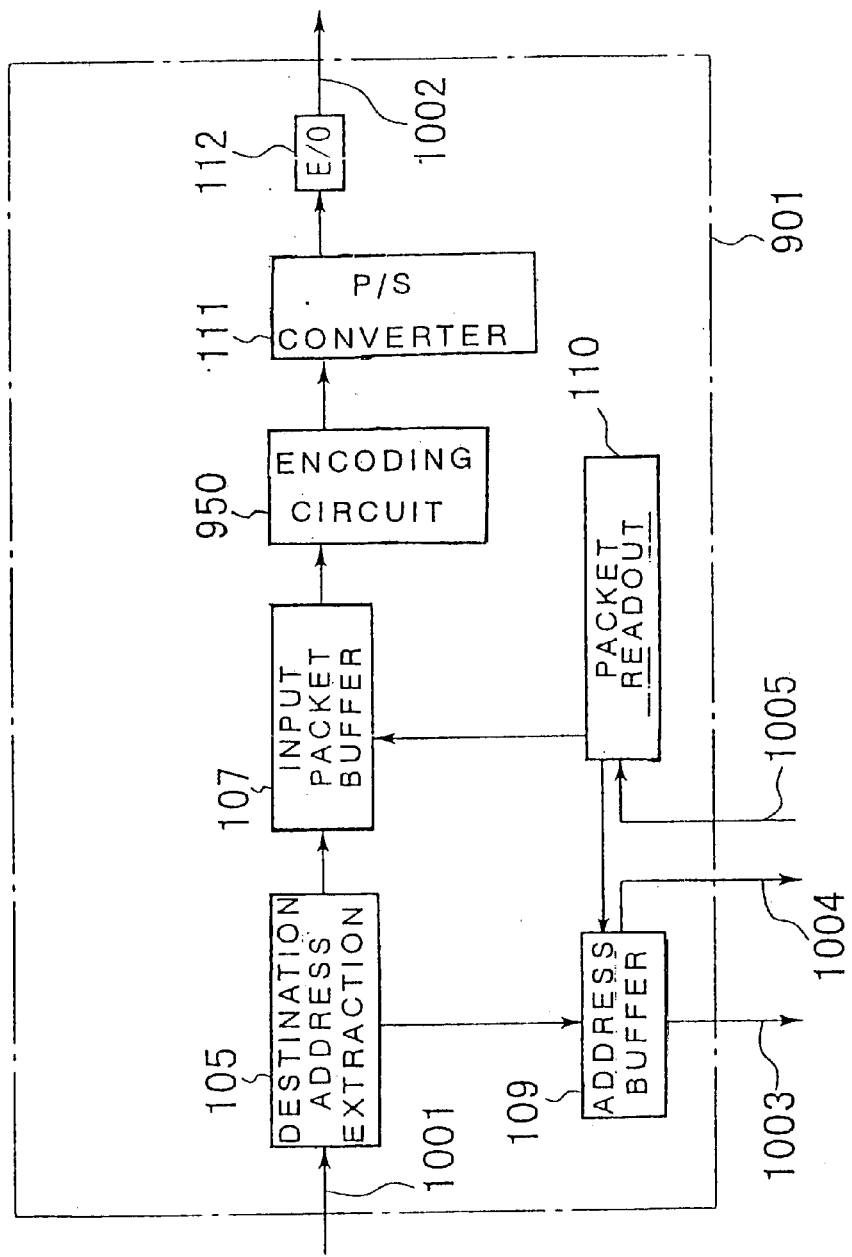
FIG. 30 illustrates the structure of input units in Examples 12 to 15.
Figure 31:
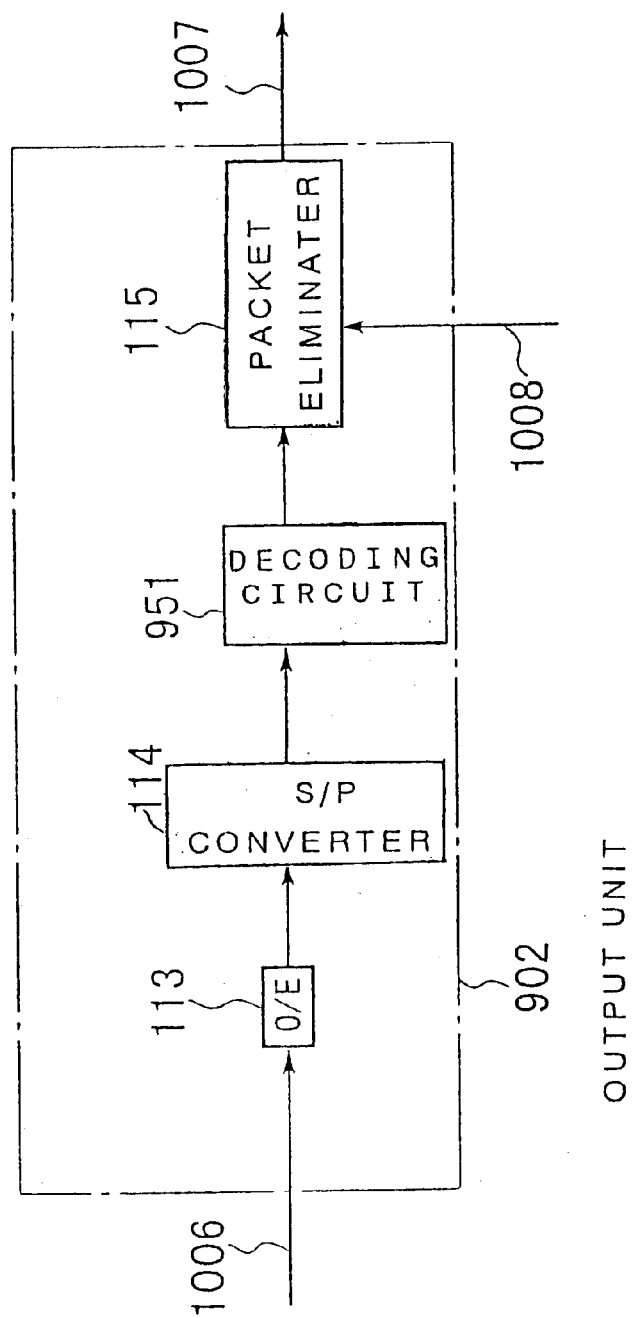
FIG. 31 illustrates the structure of the output unit in Example 12.

Referring to FIGS. 29 to 31, a twelfth example is explained. FIG. 29 shows the structure of the twelfth example. The present example is directed to an optical packet exchange apparatus for four transmission side channels and four reception side channels representing application of the third aspect to the first aspect of the present application. Referring to FIG. 29, the present example includes four input units 901, a sole optical switch 100, four output units 902, a contention resolution circuit 103 and a sole optical switch control circuit 104. In the present example, the input unit 101 and the output unit 102 of the optical packet exchange apparatus of the first embodiment are respectively changed to the input unit 901 shown in FIG. 30 and to the output unit 902 shown in FIG. 31. The following description of the present Example is mainly directed to the input unit 901 and the output unit 902.

FIG. 30 shows an illustrative structure of the sole input unit 901 of the present Example. Referring to FIG. 30, the input unit 901 includes a destination addresses extraction circuit 105, an input packet buffer 107, an address buffer 109, a packet readout circuit 110, an encoding circuit 950, a parallel/serial converter 111 and an electro-optical (E/O) converter 112.

The destination address extraction circuit 105 extracts the destination address of the input packet signal 1001 to buffer the address in the address buffer 109 while buffering the packet in the input packet buffer 107.

The address buffer 109 outputs a destination address signal 1003 and a connection request signal 1004 to the contention resolution circuit.

The packet readout circuit 110 on reception of the connection permission signal 1005 from the contention resolution circuit erases the associated address in the address buffer 109 to take out an associated packet from the input packet buffer 107 to output it to the encoding circuit 950.

The encoding circuit 950 in the present example is an 8B/10B encoding circuit for doing 8B/10B encoding. As described in detail in, for example, the publication (IBM Journal of Research and Development, vol. 27, number 5, 1983, pages 440 to 451), 8B/10B encoding converts an 8-bit signal into a 10-bit signal and, in the as-converted pattern, the number of the same bit appearing consecutively is not more than 5 and the mark ratio of 1/2 is assured by running disparity.

Meanwhile, the running disparity means such a signal which is plus or minus if the number of 1 in data transmitted so far is larger or smaller than the number of 0. In the 8B/10B code, the two sorts of 10-bit signals are allocated for the same 8-bit input signal. If the number 0 is larger in one of the codes, the number 1 is set so as to be larger in the other code, so that, if the running disparity is plus or minus, the code with a larger number of 0 and the code with a larger number of 1 is used for encoding, respectively, with the mark ratio being 1/2.

If no packet is entered to the encoding circuit 950, that is if 0 is entered in succession, the output is suppressed to not exceeding five consecutive bits of the same code, with the mark ratio being 1/2. For example, if all of 8 bits entering the 8B/10B encoding circuit are "0", that is if "00000000" is entered, an output is 1001110100 or 0110001011 depending on the running disparity being minus or plus, respectively.

Thus, if there is no packet for transmission in an input unit, and the input packet buffer 107 continues to output a packet all bits of which are 0, the encoding circuit 950 continues to output a dummy packet pattern for which there can occur no malfunction of the electrical/optical converter 112, with the parallel/serial converter 111 converting the packet signal from a parallel signal to a serial signal and with the electrical/optical converter 112 converting the serial signal into an optical signal 1002. This optical signal 1002 is output to the optical switch 100.

The operation of an output unit 902 receiving the packet optical signal from the optical switch 100 is hereinafter explained. FIG. 31 shows an illustrative structure of the output unit 902 in the present example.

Referring to FIG. 31, the output unit 902 is made up of an optical/electrical (O/E) converter 113, a serial/parallel (S/P) converter 114, a decoding circuit 951 and a packet eliminating circuit (eliminator) 115. An optical signal 1006 entered from the optical switch 100 is converted by the optical/electrical converter 113 into the electrical signal which is then converted into parallel signals by the serial/parallel converter 114 so as to be sent to the decoding circuit 951 for decoding. The decoded packet is entered to the packet eliminating circuit 115. If the packet discarding signal 1008 is supplied from the contention resolution circuit, the packet is discarded, such that the output packet signal 1007 is devoid of packets. If there is no packet discarding signal 1008, the received packet signal is output as the output packet signal 1007. If there is no packet to be received in the output unit 902, a dummy packet pattern or a packet addressed to another output unit is entered. However, since the packet discarding signal 1008 is sent from the contention resolution circuit, there is no risk of a packet addressed to an incorrect output unit being erroneously transferred to a receiving station.

EXAMPLE 11

Figure 32:
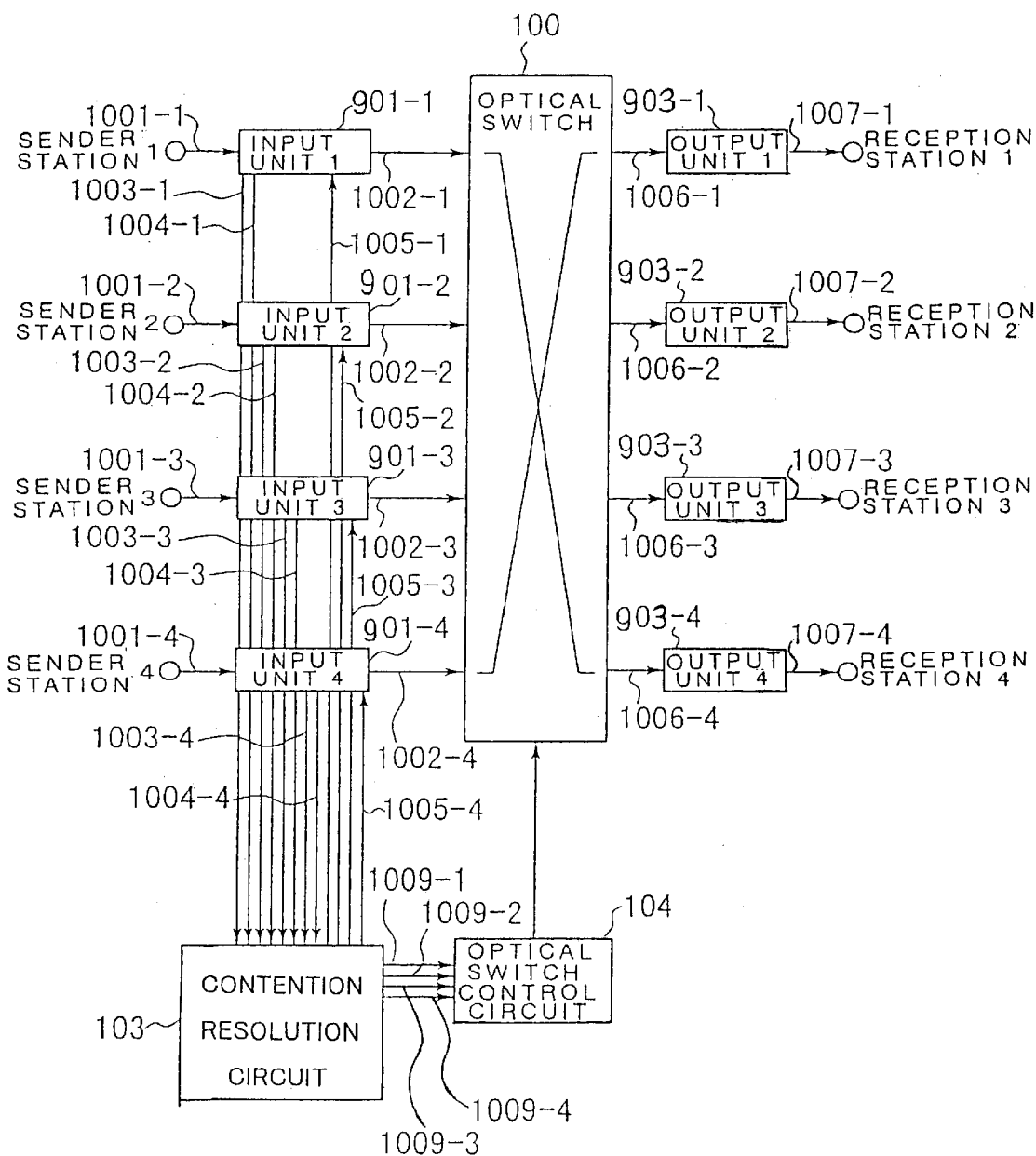
FIG. 32 illustrates the structure of Example 13.
Figure 33:
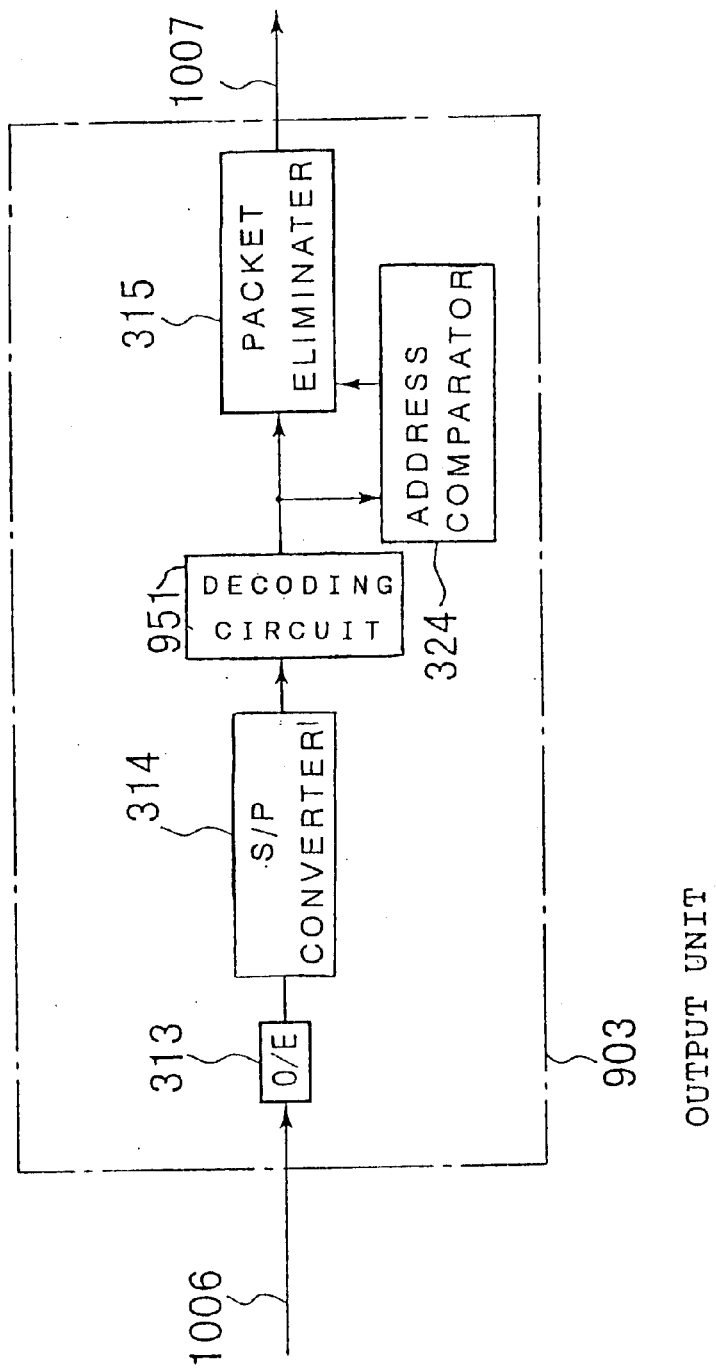
FIG. 33 illustrates the structure of the output unit in Example 13.

Referring to FIGS. 32, 33, an Example 13 is explained. FIG. 32 shows the structure of the Example 13. The present Example is directed to an optical packet exchange apparatus for four transmission channels and four reception channels representing application of the seventh and eighth aspects to the fifth aspect of the present invention. Referring to FIG. 32, the optical packet exchange apparatus of the present Example is made up of four input units 901, an optical switch 100, four output units 903, a contention resolution circuit 103 and an optical switch control circuit 104 and corresponds to the optical packet exchange apparatus of Example 12 in which the output unit 902 is changed to the output unit 903 shown in FIG. 33. The following description is directed mainly to the operation of the output unit 903 in the present Example.

FIG. 33 shows an illustrative structure of the output unit 903 of the present Example. Referring to FIG. 33, the output unit 903 is made up of an optical/electrical (O/E) converter 313, a serial/parallel (S/P) converter 314, a decoding circuit 951, a packet eliminating circuit 315 and an address comparator circuit 324. The optical signal 1006, entered from the optical switch, is converted by the optical/electrical converter 313 into an electrical signal which is converted into parallel signals by the serial/parallel converter 314. The parallel signals are decoded by the decoding circuit 951 so as to be sent to the packet eliminating circuit 315 and to the address comparator circuit 324. The address comparator circuit 324 extracts the destination address information of the packet header to compare it with the address of the own output unit. If the packet destination address coincides with the own address, the address comparator circuit 324 commands the packet to pass through it. Otherwise, the address comparator circuit 324 commands the packet eliminating circuit 315 to discard the packet.

If the output unit 903 is fed with a dummy packet pattern encoded corresponding to an all "0" packet, it is decoded by the decoding circuit 951 to an all "0" packet. Thus, there is no packet output to the receiving station even if it is not eliminated by the packet eliminating circuit 315. If a packet addressed to a different output unit is received, it is detected by the address comparator circuit 324 after decoding by the decoding circuit 951 so as to be discarded by the packet eliminating circuit 315. Thus, there is no risk of the packet addressed to a different output unit being erroneously transferred to the receiving station.

EXAMPLE 12

Figure 34:
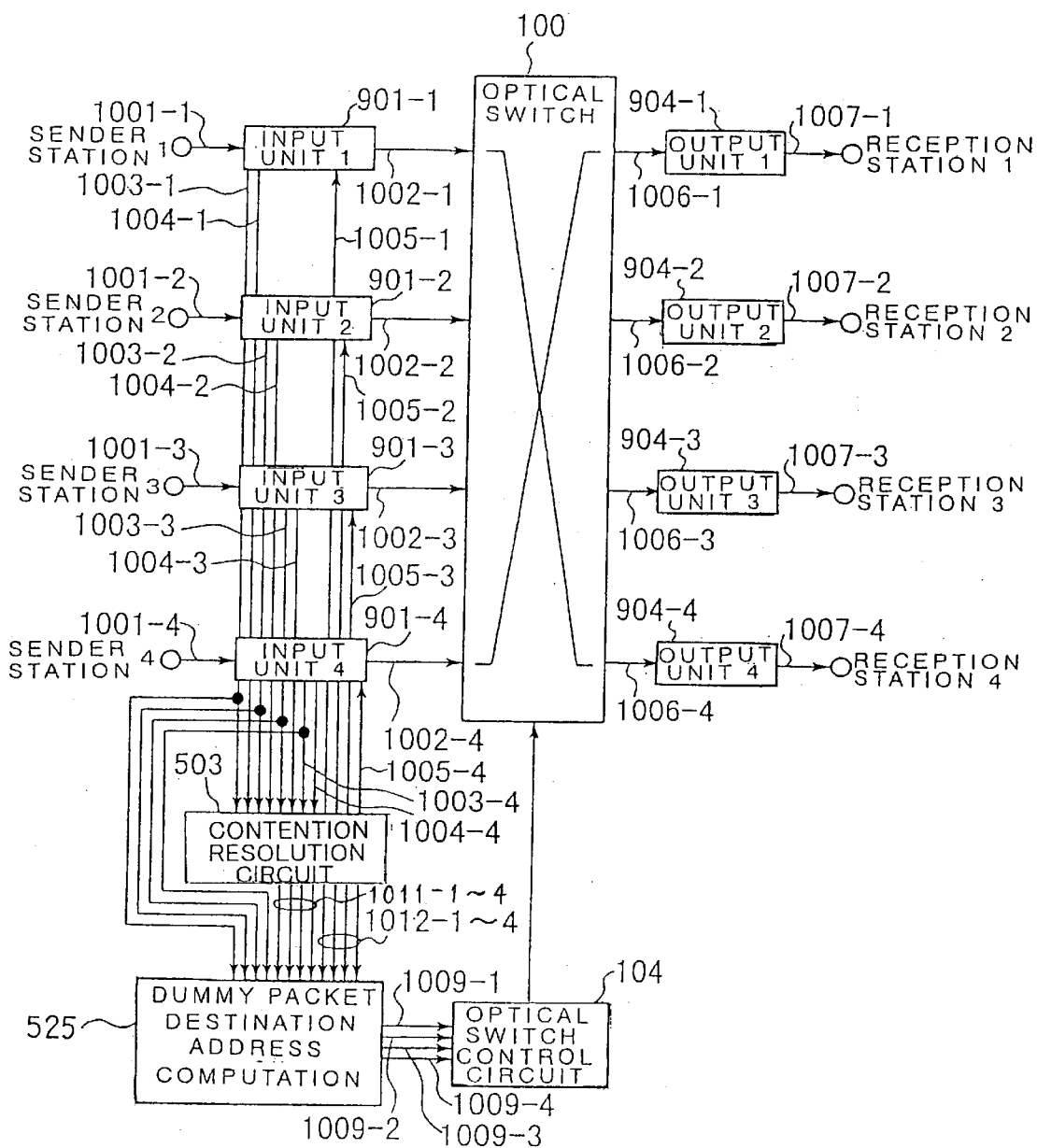
FIG. 34 illustrates the structure of Example 14.
Figure 35:
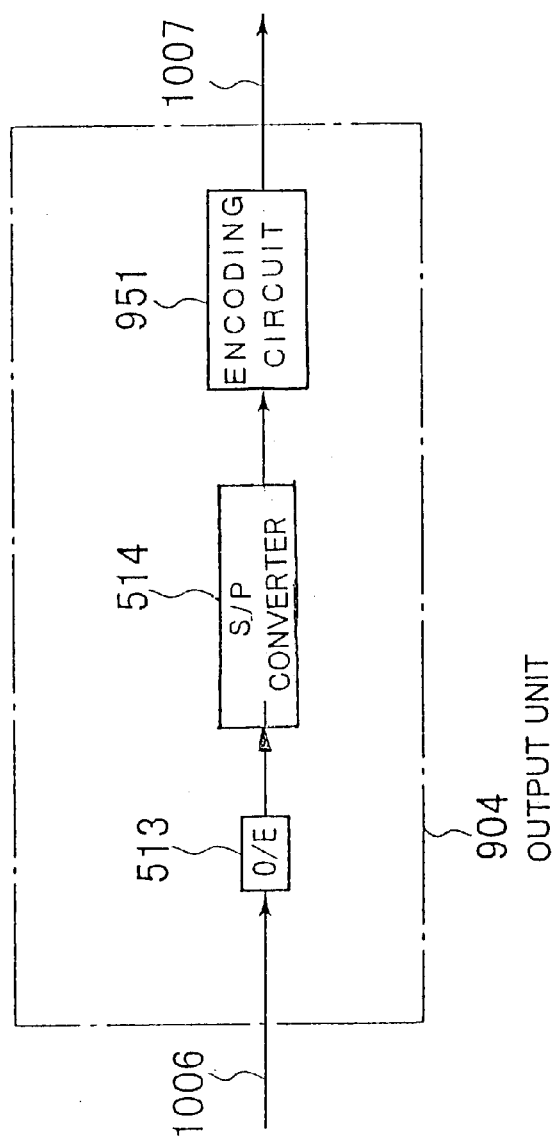
FIG. 35 illustrates the structure of the output units in Examples 14 and 15.

Referring to FIGS. 34, 35, an Example 14 is explained. FIG. 34 shows the structure of the Example 14. The present Example is directed to an optical packet exchange apparatus for four transmission channels and four reception channels representing application of the thirteenth aspect to the eleventh aspect of the present invention. Referring to FIG. 34, the optical packet exchange apparatus of the present Example is made up of four input units 901, an optical switch 100, four output units 904, a contention resolution circuit 503, a dummy packet destination address calculating circuit 525, and an optical switch control circuit 104. The present example corresponds to the optical packet exchange apparatus of Example 5 in which the input unit 101 is changed to the input unit 901 of the Example 12, and the output unit 502 is changed to an output unit 904 shown in FIG. 35. The following description is centered on the operation of the output unit 904 in the present Example.

FIG. 35 shows an illustrative structure of the output unit 904 of the present Example. Referring to FIG. 35, the output unit 904 is made up of an optical/electrical converter 513, a serial/parallel converter 514 and a decoding circuit 951. The optical signal 1006, entered from the optical switch, is converted by the optical/electrical converter 113 into an electrical signal which is converted into parallel signals by the serial/parallel converter 114. The parallel signals are decoded by the decoding circuit 951.

If a dummy packet pattern, corresponding to the encoded all "0" packet, is entered to the output unit 904, it is decoded by the decoding circuit 951 to an all "0"-packet, so that there is no risk of an erroneous packet being output to the receiving station, thus enabling a regular exchange operation.

EXAMPLE 13

Figure 36:
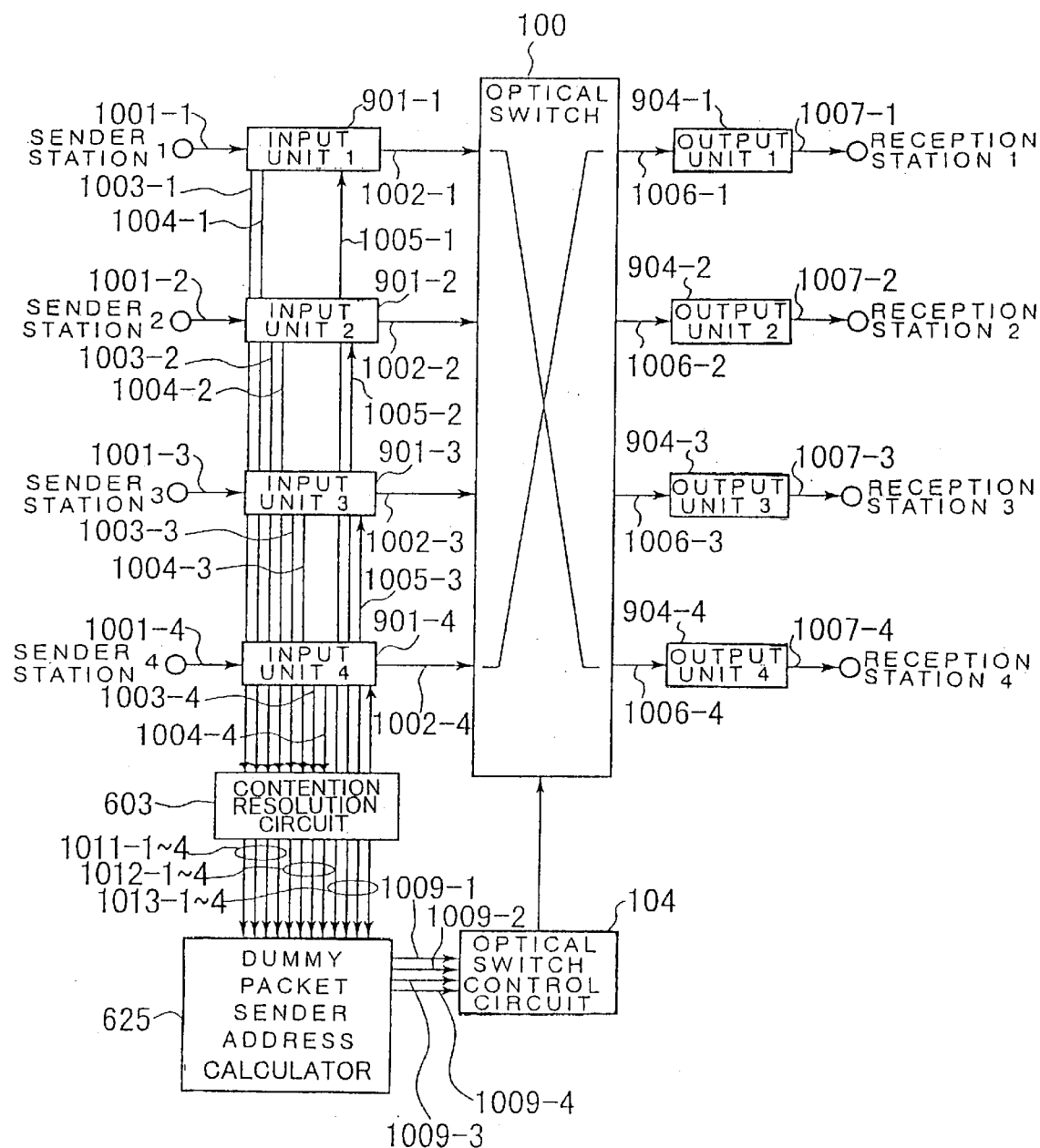
FIG. 36 illustrates the structure of Example 15.

Referring to FIG. 36, an Example 15 is explained. FIG. 36 shows the structure of the Example 15. The present Example is directed to an optical packet exchange apparatus for four transmission channels and four reception channels representing application of the sixteenth aspect to the fourteenth aspect of the present invention. Referring to FIG. 36, the optical packet exchange apparatus of the present Example is made up of four input units 901, an optical switch 100, four output units 904, a contention resolution circuit 603, a dummy packet sender address calculating circuit 625 and an optical switch control circuit 104, and corresponds to the optical packet exchange apparatus of Example 6 in which the input unit 101 is changed to an input unit 901 of Example 12 and the output unit 502 is changed to the output unit 904 shown in FIG. 35.

In the present Example, the output unit 904 devoid of the packet to be received can be connected by an extremely simplified step to the input unit 901 devoid of the packet to be transmitted, as explained in connection with the Example 6. A dummy packet pattern corresponding to the encoded all "0"-packet is output from the input unit 901 devoid of the packet to be transmitted, as explained in connection with the Example 12. The dummy packet pattern is received by the output unit 904 connected to the input unit 901 so that the optical/electrical converter 513 can operate without errors. Since the received dummy packet pattern is decoded by the decoding circuit 951 into an all "0"-packet, there is no risk of an incorrect packet being output to the receiving station to enable a regular exchange operation.

With the optical packet exchange apparatus of the present Example, as described above, the optical/electrical converter, which is inexpensive and fast in operation, can be controlled speedily without the risk of erroneous operation.

Although the Examples 1 to 7 and 12 to 15 are packet exchange apparatus having four transmission side channels and four reception side channels, the numbers of channels can be optionally selected on the transmission and reception sides.

In the Examples 1 to 7 and 12 to 15, the optical switch 100 is a splitter/combiner type optical switch having four optical splitters, 16 optical gates 11 and four optical combiners 12. The structure of the optical switch in the first to seventeenth aspects of the present invention is, however, not limited to the splitter/combiner type and may be of any suitable structure provided that optical signals entered from different input ports can be output from the same output port.

In the Examples 12 to 15, the encoding circuit 950 and the decoding circuit 951 are of the 8B/10B encoding circuit and the 8B/10B decoding circuit, respectively. However, the encoding system in the first, third, fifth, seventh, eleventh, thirteenth, fourteenth and sixteenth aspects of the present invention may be scramble +16BIMS code, 4B5B+NRZI code or the Manchester code etc., provided that the operating conditions of the contiguous same code and the mark ratio satisfy the operating conditions of the optical/electrical converter. The encoding circuit 950 may be connected at intermediate between the parallel/serial converter and the electrical/optical converter, while the decoding circuit 951 may be connected at intermediate between the optical/electrical converter and the serial/parallel converter.

In the Examples 1 to 7, encoding circuits and decoding circuits may also be provided on the input and output units, respectively.

Also, in the above Examples 1, 3, 5 and 6, the dummy packet generating circuit 106 is provided independently of the input packet buffer 107, and the selector 108 is controlled by a packet readout circuit. Alternatively, a dummy packet pattern storage area may be provided in the input packet buffer 107 so that a dummy packet may be read out from this storage area for transmission under control by the dummy packet readout circuit 110.

In the Examples 8 to 11, the optical switch is of the four transmission side channels and four reception side channels. However, the number of channels may be freely selected for both the transmission and reception sides.

In the Examples 1 to 15, a semiconductor light amplifier is used. However, other devices may be used as the optical gate. Examples of the devices that may be used include an electrical field absorbing type optical modulator, an optical switch mounted on a lithium niobate substrate and which utilizes an electro-optical or acousto-optical effect, an optical switch formed of a polymer waveguide, a liquid crystal optical switch, a mechanical optical switch and an optical fiber amplifier etc.

In the above Examples 8 and 10, a combination of a variable wavelength semiconductor laser light source and an electrical field absorbing type semiconductor optical modulator is used as the variable wavelength electrical/optical converter. Alternatively, a tunable DFB laser, a tunable DBR laser or a tunable external resonator type laser may also be used as a light source. Although the electrical field absorbing type modulator is used as a modulator, the material and the structure of the optical modulator may be selected otherwise. For example, the optical modulator exploiting the electro-optical effect or the acousto-optical effect proper to the lithium niobate crystal may also be used.

In the above Examples 9 and 11, an acousto-optical effect optical filter formed by a lithium niobate crystal is used as a wavelength selector. However, the wavelength selector in the nineteenth, twenty-second and twenty-third aspects of the present invention may be of any suitable structure provided that it can select and output one of plural wavelengths. For example, the wavelength filter or selector comprised of the optical length splitter, optical gate and an optical combining device or a mechanical variable wavelength filter may be used.

Effects of the invention are summarized hereinbelow without limitative intent.

With the above-described optical packet exchange apparatus and optical switch according to the present invention, if, in an optical packet exchange apparatus, there is no packet to be transmitted, and a dummy packet is sent so that there is no "0" or "1" bit pattern continuing for a longer time than a pre-set period to prevent malfunction of the optical/electrical converter of the output unit, search for a connection pattern between an input unit devoid of a packet for transmission and an output unit devoid of a packet for reception is reduced and can be effected speedily, so that fast switch control can be realized even if the number of channels of the exchange apparatus or the network speed is increased.

According to the present invention, the hardware quantity (or volume) may also be reduced.

Further, according to the present invention, dummy packets or packets used in substitution of dummy packets and which are addressed to different receiving stations can be eliminated speedily to prevent malfunction of the reception station without lowering the operating speed of the packet exchange apparatus.

According to the present invention, since the optical gate and the wavelength selector in an optical switch can be controlled by the same address decoder, the number of control lines can be decreased, while broadcasting or multi casting is facilitated. Since there is no congestion of the optical wiring between the optical gates and the wavelength selectors, synchronous control of the optical gates and the wavelength selectors is also facilitated.

It should be noted that other objects of the present invention will become apparent in the entire disclosure and that modifications may be done without departing the gist and scope of the present invention as disclosed herein and appended herewith.

Also it should be noted that any combination of the disclosed and/or claimed elements, matters and/or items may fall under the modifications aforementioned.

What is claimed is:

1. An optical switch comprising:
(a) a plurality of transmitters having variable wavelength electrical/optical converting means and address decoding means;
(b) optical combining/splitting means;
(c) a plurality of receivers having fixed wavelength filter means and optical/electrical converting means; and further,
(d) an address conversion circuit converting an address to be accorded to said address decoding means from a sender address for a receiver to a destination address for a transmitter (sender device).

2. An optical switch comprising:
(a) a plurality of transmitters having fixed wavelength electrical/optical conversion means having different wavelengths allocated to different transmitters;
(b) optical combining/splitting means;
(c) a plurality of receivers having wavelength selection means, optical/electrical converting means and address decoding means; and further,
(d) an address conversion circuit converting an address to be accorded to said address decoding means from a destination address for a transmitter to a sender address for a receiver.

3. An optical switch comprising:
(a) M groups of variable wavelength electrical/optical converting means, each of said groups having N variable wavelength electrical/optical converting means each outputting an optical signal of any one of M different wavelengths $\lambda 1, \lambda 2, \ldots \lambda M$, N and M being integers not less than 2;
(b) M-number of N×K-optical spatial switch means for switching paths of N optical output signals of one group of said variable wavelength electrical/optical converting means, K being an integer not less than 2;
(c) K-number of optical combining/splitting means for combining optical signals from respective different output ports of said M-number of N×K-optical spatial switch means for splitting the combined signal into M-number of outputs;
(d) MK-number of fixed wavelength filter means; and
(e) MK-number of optical/electrical converting means;
(f) said optical spatial switch including:
  (f1) N-number of optical splitting means branching into K branches,
  (f2) optical gate means for turning optical signals branched by said optical splitting means on/off, and
  (f3) N-number of optical combining means for combining optical signals from K-number of different optical branching means;
(g) wherein said optical switch further comprises address decoding means for controlling said variable wavelength electrical/optical converting means and one of said optical gate means connected to said optical splitting means.

4. The optical switch as defined in claim 3 which further comprises:
address conversion means for converting a sender address for a receiver to a destination address for a transmitter to enter the converted destination address to said address decoding means.

5. An optical switch comprising:
(a) K groups of fixed wavelength electrical/optical converting means, each of said groups having M-number of fixed wavelength optical/electrical converting means to which are allocated M different wavelengths $\lambda 1, \lambda 2, \ldots \lambda M$, M and K being integers not less than 2;
(b) K-number of optical combining/splitting means for combining M-number of optical outputs of one group of said fixed wavelength electrical/optical converting means and for branching the combined signal into M branches;

(c) M-number of K×N optical spatial switch means having outputs of K different optical combining/splitting means as inputs, N being an integer not less than 2;

(d) MN-number of wavelength selecting means for selecting an optical signal of any wavelength from the outputs of the optical spatial switch means, to output the selected signal; and (e) MN-number of optical/electrical converting means;

(f) wherein said optical spatial switch means has:
  (f1) K-number of optical splitting means branching into N branches,
  (f2) optical gate means for turning the optical signals branched by said optical splitting means on/off, and
  (f3) N-number of optical combining means for combining optical signals branched by said K different optical branching means; and (g) wherein there is further provided address decoding means for controlling one of said optical gate means connected to said optical combining means and said wavelength selecting means by a sender address for a receiver.

6. The optical switch as defined in claim 5 which further comprises:

address conversion means for converting a destination address for a transmitter to a sender address for a receiver to supply the converted destination address to said address decoding means.

* * * * *